US012159198B2

United States Patent
Lechner et al.

(10) Patent No.: US 12,159,198 B2
(45) Date of Patent: Dec. 3, 2024

(54) METHOD OF COMPUTING A SOLUTION TO A COMPUTATIONAL PROBLEM USING A QUANTUM SYSTEM AND APPARATUS FOR COMPUTING SOLUTIONS TO COMPUTATIONAL PROBLEMS

(71) Applicant: PARITY QUANTUM COMPUTING GMBH, Innsbruck (AT)

(72) Inventors: Wolfgang Lechner, Rum (AT); Andreas Hartmann, Innsbruck (AT)

(73) Assignee: PARITY QUANTUM COMPUTING GMBH, Innsbruck (AT)

( * ) Notice: Subject to any disclaimer, the term of this patent is extended or adjusted under 35 U.S.C. 154(b) by 479 days.

(21) Appl. No.: 17/620,497

(22) PCT Filed: Jun. 25, 2019

(86) PCT No.: PCT/EP2019/066916
§ 371 (c)(1),
(2) Date: Dec. 17, 2021

(87) PCT Pub. No.: WO2020/259813
PCT Pub. Date: Dec. 30, 2020

(65) Prior Publication Data
US 2022/0343201 A1    Oct. 27, 2022

(51) Int. Cl.
*G06N 10/40* (2022.01)
*G06N 10/80* (2022.01)

(52) U.S. Cl.
CPC .............. *G06N 10/40* (2022.01); *G06N 10/80* (2022.01)

(58) Field of Classification Search
CPC ........ G06F 30/27; G06F 1/26; G06F 16/2455; G06F 16/217; G06F 16/248;
(Continued)

(56) References Cited

U.S. PATENT DOCUMENTS 9,858,531 B1 * 1/2018 Monroe ................. G06N 10/00
2015/0111754 A1   4/2015 Harris et al.
(Continued)

FOREIGN PATENT DOCUMENTS

EP    3113084 A1    1/2017

OTHER PUBLICATIONS

International Search Report and Written Opinion mailed Mar. 13, 2020 in PCT/EP2019/066916 (14 pages).
(Continued)

*Primary Examiner* — Binh C Tat
(74) *Attorney, Agent, or Firm* — Meunier Carlin & Curfman LLC

(57) ABSTRACT

A method of computing a solution to a computational problem using a quantum system comprising a plurality of qubits includes encoding the computational problem into a single-body problem Hamiltonian comprising a plurality of adjustable parameters, and encoding comprises determining a problem-encoding configuration for the plurality of adjustable parameters. The method includes evolving an initial Hamiltonian at an initial time into a final Hamiltonian at a final time via an intermediate Hamiltonian at an intermediate time, the intermediate Hamiltonian a linear combination of the initial Hamiltonian, the final Hamiltonian and a first short-range Hamiltonian, the final Hamiltonian a sum of the problem Hamiltonian and a second short-range Hamiltonian, the plurality of adjustable parameters of the problem Hamiltonian in the problem-encoding configuration, the second short-range Hamiltonian a d-body Hamiltonian; measuring a portion of the plurality of qubits to obtain a read-out; and determining a solution to the computational problem from the read-out.

20 Claims, 10 Drawing Sheets

(58) Field of Classification Search
CPC .... G06F 16/9035; G06F 16/906; G06F 21/44; G06F 21/6245; G06F 16/182; G06F 16/24537; G06F 16/24544; G06F 16/24552; G06F 16/2456; G06F 16/2462; G06F 16/2471; G06F 16/27; G06F 16/278; G06F 9/4881; G06F 9/5044; G06F 9/5055; G06F 3/011; G06F 3/017; G06F 17/11; G06F 21/10; G06F 21/64; G06F 2203/011; G06F 2221/2109; G06F 3/0346; G06F 8/36; G06F 16/137; G06F 18/2415; G06F 18/295; G06F 2111/10; G06F 15/16; G06F 17/12; G06F 17/13; G06F 17/14; G06F 21/76; G06F 2203/012; G06F 2203/04806; G06F 2203/04808; G06F 3/013; G06F 3/0304; G06F 3/04845; G06F 3/04847; G06F 3/04883; G06F 9/3877; G06F 9/5027; G06F 18/23; G06F 2111/20; G06F 30/28; G06F 9/451; G06F 11/0736; G06F 11/0751; G06F 11/0793; G06F 15/163; G06F 13/36; G06F 13/4068; G06F 15/76; G06F 15/7817; G06F 17/16; G06N 3/08; G06N 20/00; G06N 10/00; G06N 10/80; G06N 10/60; G06N 3/0455; G06N 10/20; G06N 10/40; G06N 3/126; G06N 3/086; G06N 10/70; G06N 3/0675; G06N 99/00
USPC .................................................. 716/100–106
See application file for complete search history.

(56) References Cited

U.S. PATENT DOCUMENTS

| | | | |
|---|---|---|---|
| 2018/0330264 A1* | 11/2018 | Lanting | G06N 10/00 |
| 2019/0095811 A1* | 3/2019 | Antonio | G06N 10/00 |

OTHER PUBLICATIONS

Phillip Hauke et al., "Perspectives of quantum annealing: Methods and implementations", Arxiv.org, Cornell University Library, 201 Olin Library Cornell University Ithaca, NY, 14853, Mar. 15, 2019, Sections 1, 3.

Andreas Hartmann et al., "Rapid counter-diabetic sweeps in lattice gauge adiabatic quantum computing", Arxiv.org, Cornell University Library, 201 Olin Library Cornell University Ithaca, NY 14853, Jul. 5, 2018, pp. 1-6.

* cited by examiner

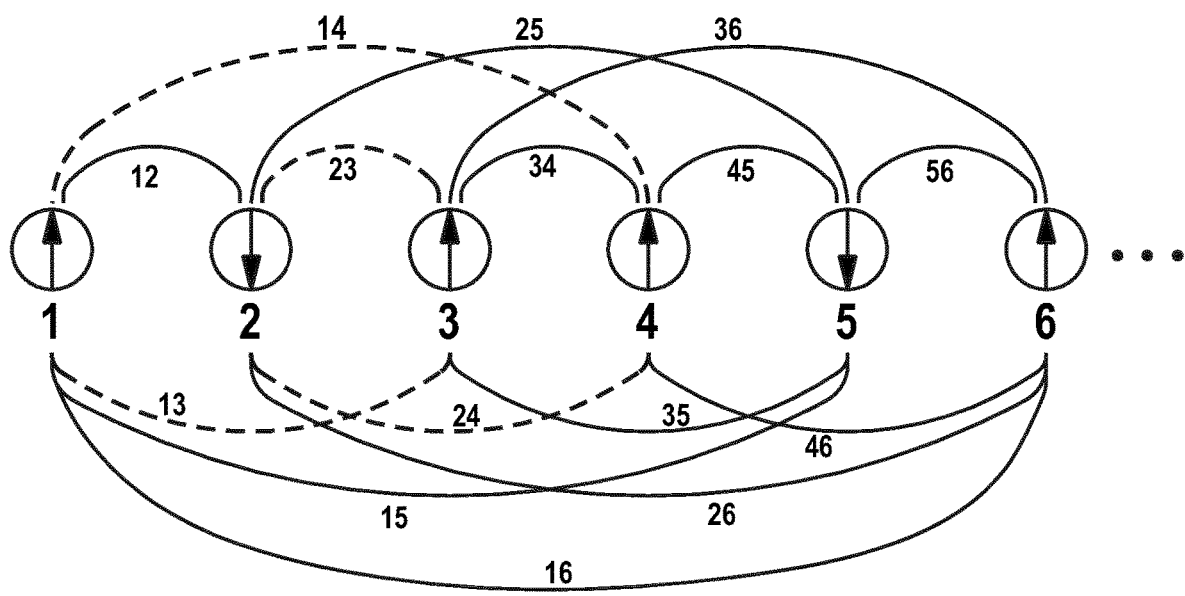

0 1 2 3 4 5 6 i j k

↑ ↑ ↑ = 1
↑ ↑ ↓ = 0
↑ ↓ ↑ = 0
↑ ↓ ↓ = 1
↓ ↑ ↑ = 0
↓ ↑ ↓ = 1
↓ ↓ ↑ = 1
↓ ↓ ↓ = 0

0 = |0>   1 = |1>

0 = 0, 2, 4

METHOD OF COMPUTING A SOLUTION TO A COMPUTATIONAL PROBLEM USING A QUANTUM SYSTEM AND APPARATUS FOR COMPUTING SOLUTIONS TO COMPUTATIONAL PROBLEMS

CROSS REFERENCE TO RELATED APPLICATIONS

This application is a United States National Phase Patent Application of International Patent Application Number PCT/EP2019/066916, filed on Jun. 25, 2019, which is incorporated by reference herein in its entirety.

FIELD

Embodiments described herein relate to apparatuses and methods for computing solutions to computational problems using a quantum system, and more specifically a quantum system including a plurality of quantum bits (qubits).

BACKGROUND

Quantum computing devices are computing devices which make use of quantum mechanical effects to solve computational problems. In a quantum computing device, or quantum computer, information is carried by quantum systems, such as e.g. quantum bits ("qubits"). This is in contrast to conventional computers, which operate with classical bits, i.e. 0 and 1. During a quantum computation, quantum bits can be processed by evolving the quantum system. For example, groups of qubits of the quantum system can be coupled to each other according to a specified interaction. By evolving the quantum system, the information carried by the quantum system can be processed in order to carry out a computation, i.e. in order to solve a computational problem. In many cases, a quantum computer can be assisted by a classical computer, i.e. a computer operating with classical bits. The classical computer can provide instructions to the quantum computer as to how the qubits in the system are to be processed by the quantum computer.

Quantum computers can be used for solving computational problems, such as e.g. optimization problems. The performance of a quantum computation for solving a computational problem can be measured by considering the scaling of the runtime of the quantum computation with increasing size of the computational problem. Another way of assessing the performance of the quantum computation is to consider whether the quantum computer is capable of providing an exact solution to the computational problem (e.g. an absolute minimum, in case the computational problem is a minimization problem) or only an approximate solution, and whether an approximate solution provided by the quantum computer is sufficiently close to the actual solution.

For computational problems of interest, many approaches to quantum computation involve an exponential scaling of the runtime as a function of the size of the computational problem. Other approaches might provide a better, i.e. smaller, runtime, but are only capable of providing a rough approximation to the actual solution of the computational problem, which may not be sufficient for practical applications.

Therefore, there is a need for improved methods and devices for solving computational problems using a quantum system.

SUMMARY

According to an embodiment, a method of computing a solution to a computational problem using a quantum system comprising a plurality of qubits is provided. The method includes encoding the computational problem into a problem Hamiltonian of the quantum system, wherein the problem Hamiltonian is a single-body Hamiltonian comprising a plurality of adjustable parameters, and wherein the encoding comprises determining, from the computational problem, a problem-encoding configuration for the plurality of adjustable parameters. The method includes evolving an initial Hamiltonian of the quantum system at an initial time into a final Hamiltonian of the quantum system at a final time via an intermediate Hamiltonian of the quantum system at an intermediate time, wherein the intermediate time is between the initial time and the final time. The intermediate Hamiltonian is a linear combination of the initial Hamiltonian, the final Hamiltonian and a first short-range Hamiltonian. The final Hamiltonian is the sum of the problem Hamiltonian and a second short-range Hamiltonian, wherein the plurality of adjustable parameters of the problem Hamiltonian are in the problem-encoding configuration, wherein the second short-range Hamiltonian is a d-body Hamiltonian and d is independent of the computational problem. The method includes measuring at least a portion of the plurality of qubits to obtain a read-out of the quantum system. The method includes determining a solution to the computational problem from the read-out.

According to a further embodiment, an apparatus for computing solutions to computational problems, is provided. The apparatus includes a quantum system comprising a plurality of qubits. The apparatus includes a cooling unit, adapted for cooling the quantum system towards a ground state of the quantum system. The apparatus includes a Hamiltonian evolution unit, adapted for evolving an initial Hamiltonian of the quantum system into a final Hamiltonian of the quantum system via an intermediate Hamiltonian of the quantum system. The intermediate Hamiltonian is a linear combination of the initial Hamiltonian, the final Hamiltonian and a first short-range Hamiltonian. The final Hamiltonian is a sum of a problem Hamiltonian and a second short-range Hamiltonian, wherein the problem Hamiltonian is a single-body Hamiltonian comprising a plurality of adjustable parameters. The apparatus includes a measurement device adapted for measuring at least a portion of the plurality of qubits. The apparatus includes a classical computing system, connected to the Hamiltonian evolution unit and to the measurement device.

Embodiments are also directed to methods for operating the disclosed systems and devices, and to the use of the disclosed system to perform the methods according to the embodiments described herein.

Further advantages, features, aspects and details that can be combined with embodiments described herein are evident from the dependent claims, the description and the drawings.

BRIEF DESCRIPTION OF THE DRAWINGS

A full and enabling disclosure to one of ordinary skill in the art is set forth more particularly in the remainder of the specification including reference to the accompanying drawings, wherein:

FIGS. 10-17 illustrate specific encodings of a computational problem into a problem Hamiltonian and the corresponding final Hamiltonian, according to embodiments described herein.

DETAILED DESCRIPTION

Figure 1:
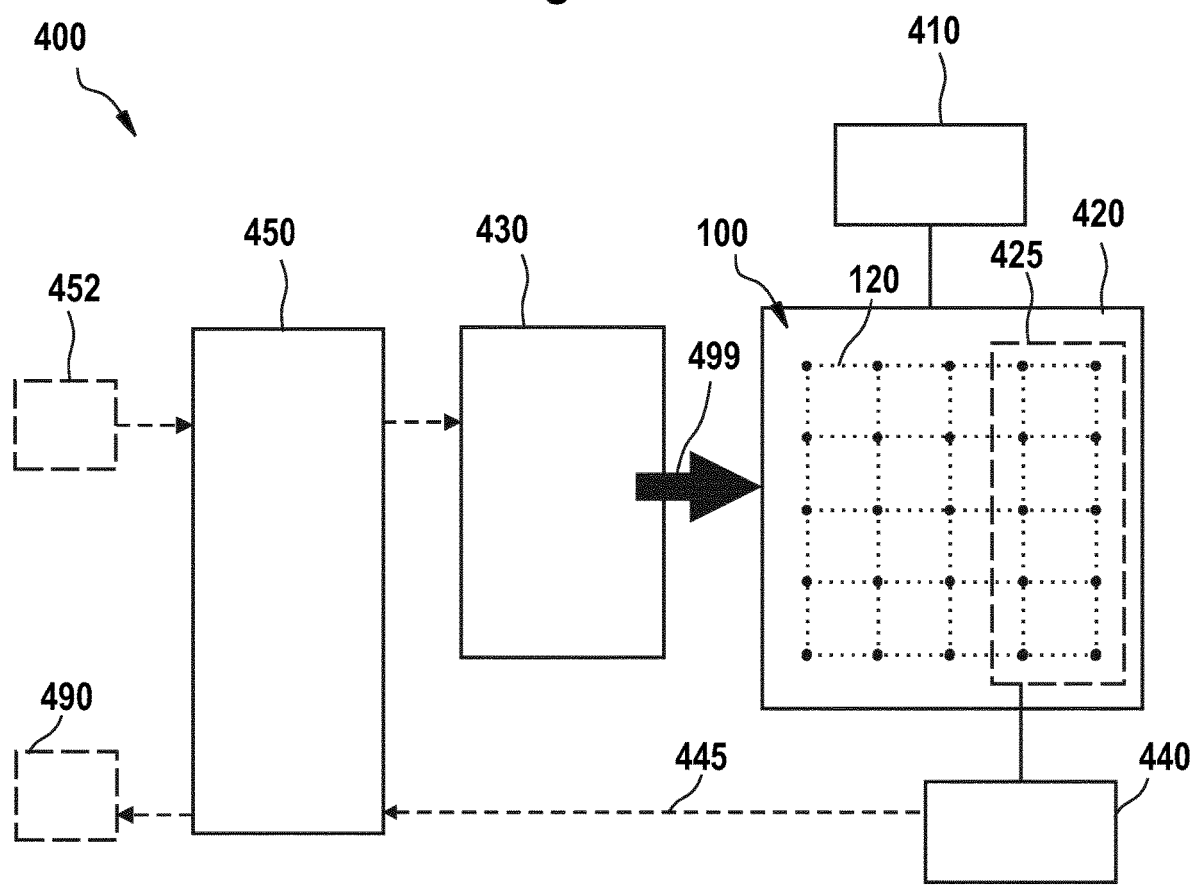
FIG. 1 shows an apparatus for computing solutions to computational problems using a quantum system, according to embodiments described herein.

Reference will now be made in detail to the various exemplary embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

Within the following description of the drawings, the same reference numbers refer to the same components. Generally, only the differences with respect to the individual embodiments are described. The structures shown in the drawings are not necessarily depicted true to scale, and may contain details drawn in an exaggerated way to allow for a better understanding of the embodiments.

Embodiments described herein relate to a quantum system including a plurality of qubits. A qubit, as described herein, can be understood as a quantum mechanical two-level system. A qubit may include two quantum basis states $|0\rangle$ and $|1\rangle$ representing possible quantum states of the qubit. According to the superposition principle of quantum mechanics, every superposition of the form $a|0\rangle+b|1\rangle$ is a possible quantum state of the qubit. Therein, a and b are complex numbers. Mathematically, a qubit may be represented by a two-dimensional vector space. A plurality of qubits may have quantum basis states corresponding to configurations in which each qubit of the plurality of qubits is either in the quantum state $|0\rangle$ or in the quantum state $|1\rangle$. Considering, for example, a plurality of five qubits, an exemplary quantum basis state for the 5 qubits may be $|00101\rangle$. The quantum state $|00101\rangle$ represents a configuration wherein the first, second and fourth qubit are in the quantum state $|0\rangle$ and the third and fifth qubit are in the quantum state $|1\rangle$. For a plurality of m qubits, there are $2^m$ quantum basis states. In view of the superposition principle, given two quantum states for a plurality of qubits, a superposition of the quantum basis states is also a quantum state for the plurality of qubits. For example, a superposition of the form $a|0101\rangle+b|11110\rangle+c|11111\rangle$, with a, b and c complex numbers, is a quantum state for the plurality of qubits. Mathematically, a quantum system consisting of a plurality of m qubits can be represented by a $2^m$-dimensional vector space.

The plurality of qubits may include or consist of a plurality of superconducting qubits, e.g. transmon or flux qubits. A superconducting qubit may include a primary and a secondary superconducting loop. Superconducting currents propagating clockwise and counter-clockwise, respectively, in the primary superconducting loop can form the quantum basis states $|1\rangle$ and $|0\rangle$ of the superconducting qubit. Further, a magnetic flux bias through the secondary superconducting loop can couple the quantum basis states $|0\rangle$ and $|1\rangle$.

Alternatively, the quantum system may be realized using a system of trapped ions. In this case, the quantum basis states $|0\rangle$ and $|1\rangle$ of a qubit are formed by two levels of a Zeeman- or hyperfine manifold or across a forbidden optical transition of alkaline earth, or alkaline earth-like positively charged ions, such as Ca40+.

As yet a further alternative, the quantum system may be realized using ultracold atoms, e.g. ultracold neutral Alkali atoms, which are trapped in an optical lattice or large spacing lattices from laser fields. The atoms can be evolved towards a ground state using laser cooling. The quantum basis states of a qubit are formed by the ground state of an atom and a high-lying Rydberg state. The qubits can be addressed by laser light.

As yet a further alternative, the quantum system may be realized with quantum dots. Quantum Dot Qubits may be fabricated from GaAs/AlGaAs heterostructures. The qubits are encoded in spin states, which may be prepared by adiabatically tuning the potential from a single well to a double well potential.

As yet a further alternative, the quantum system may be realized with impurities in solid-state crystals, such as NV Centers, which are point defects in diamond crystals. Other impurities are being investigated, e.g., color centers tied to chromium impurities, rare-earth ions in solid-state crystals, or defect centers in silicon carbide. NV Centers have two unpaired electrons, which provides a spin-1 ground state that allows the identification of two sharp defect levels with large life times that can be used to realize a qubit, possibly in conjunction with the surrounding nuclear spins.

According to embodiments, the quantum system may include one or more, or a plurality of individual q-level quantum systems, wherein q may be a constant. For example, q may be in the range from 2 to 8, e.g., 3, 4, 5, or 6. An individual q-level quantum system may include a basis consisting of q states $|0\rangle, |1\rangle, \ldots |q-1\rangle$. An individual 3-level quantum system will be referred to as a "qutrit".

A Hamiltonian of a quantum system can represent an interaction or a plurality of interactions for the quantum system. A Hamiltonian is an operator acting on the quantum system. Eigenvalues of a Hamiltonian correspond to an energy spectrum of the quantum system. A ground state of a Hamiltonian is a quantum state of the quantum system with minimal energy. A ground state of a Hamiltonian may be a quantum state at zero temperature.

A classical computing system, as described herein, can be understood as a computing system operating with classical bits. A classical computing system may include a central processing unit (CPU) for processing information with classical bits and/or a memory for storing information with classical bits. A classical computing system may include one or more conventional computers and/or a network of conventional computers, such as personal computers (PCs).

Before providing a detailed description of embodiments, some aspects of the present disclosure will be explained with reference to FIGS. 1-3.

Figure 2:
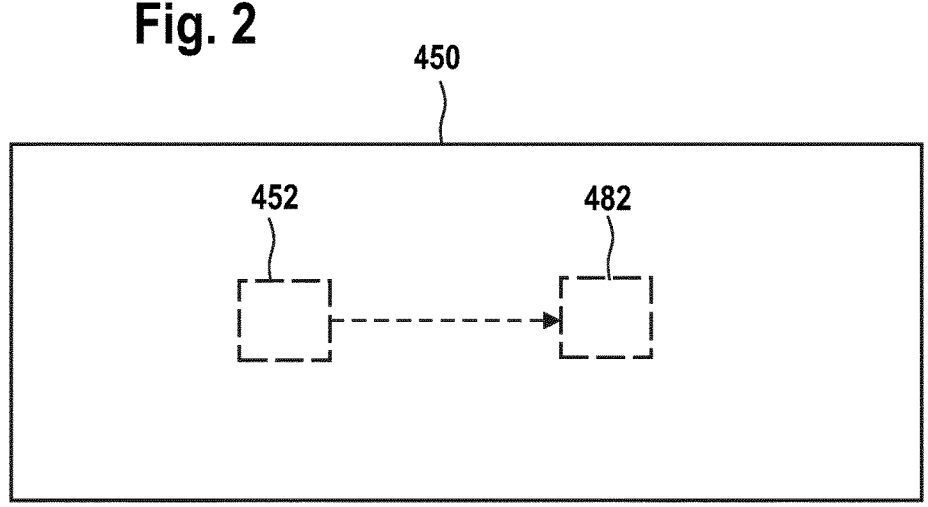
FIG. 2 shows an example of a classical computing system according to embodiments described herein.

FIG. 1 illustrates an exemplary apparatus 400 for computing solutions to computational problems according to embodiments described herein. The apparatus 400 is adapted for computing solutions to computational problems using a quantum system 420. The quantum system 420 includes a plurality of qubits 100, each of which is represented in FIG. 1 by a black dot. As shown in FIG. 1, the plurality of qubits 100 can be arranged according to a 2-dimensional lattice 120, in particular a two-dimensional square lattice.

FIG. 1 further shows a classical computing system 450. The classical computing system 450 is configured for receiving, as an input, a computational problem 452 to be solved. The computational problem 452 may, e.g., be an NP-hard problem, such as, e.g., the traveling salesman problem or the Ising spin model problem. Therein, "NP" stands for "non-deterministic polynomial time".

The classical computing system 450 is configured for encoding the computational problem 452 into a problem Hamiltonian of the quantum system 420. FIG. 2 schematically illustrates a classical computing system 450 which encodes the computational problem 452 into a problem Hamiltonian 482.

According to embodiments described herein, the problem Hamiltonian 482 is a single-body Hamiltonian having a plurality of adjustable parameters. For example, the problem Hamiltonian 482 may have the form $H^{prob} = \Sigma_k J_k \sigma_z^{(k)}$, wherein each $\sigma_z^{(k)}$ is a Pauli operator acting on a k-th qubit of the plurality of qubits 100, and wherein each $J_k$ is an adjustable parameter determined by one or more external entities, e.g. magnetic fields, which can be adjusted at every qubit k individually. For example, $J_k$ may be the strength of an adjustable magnetic field influencing the k-th qubit. A plurality of adjustable external entities, e.g. magnetic fields, may be provided, wherein each adjustable external entity influences a single qubit of the plurality of qubits. By adjusting the external entities, the parameters $J_k$ can be adjusted depending on the computational problem 452.

Encoding the computational problem 452 in the problem Hamiltonian 482, as performed by the classical computing system 450, includes determining, from the computational problem 452, a problem-encoding configuration for the plurality of adjustable parameters of the problem Hamiltonian. For example, the classical computing system 450 can compute suitable values of the parameters $J_k$ which encode the computational problem 452. For each of the adjustable parameters, a parameter value may be determined depending on the computational problem 452. Accordingly, the problem-encoding configuration of the plurality of adjustable parameters of the problem Hamiltonian 482 depends on the computational problem 452.

Referring again to FIG. 1, the apparatus 400 includes a Hamiltonian evolution unit 430. The Hamiltonian evolution unit 430 is adapted for allowing the qubits of the quantum system 420 to interact with each other, wherein the interactions are represented by a Hamiltonian of the quantum system 420.

According to embodiments described herein, the Hamiltonian evolution unit 430 is configured for evolving an initial Hamiltonian of the quantum system 420 into a final Hamiltonian of the quantum system 420 via an intermediate Hamiltonian of the quantum system 420.

Figure 3:
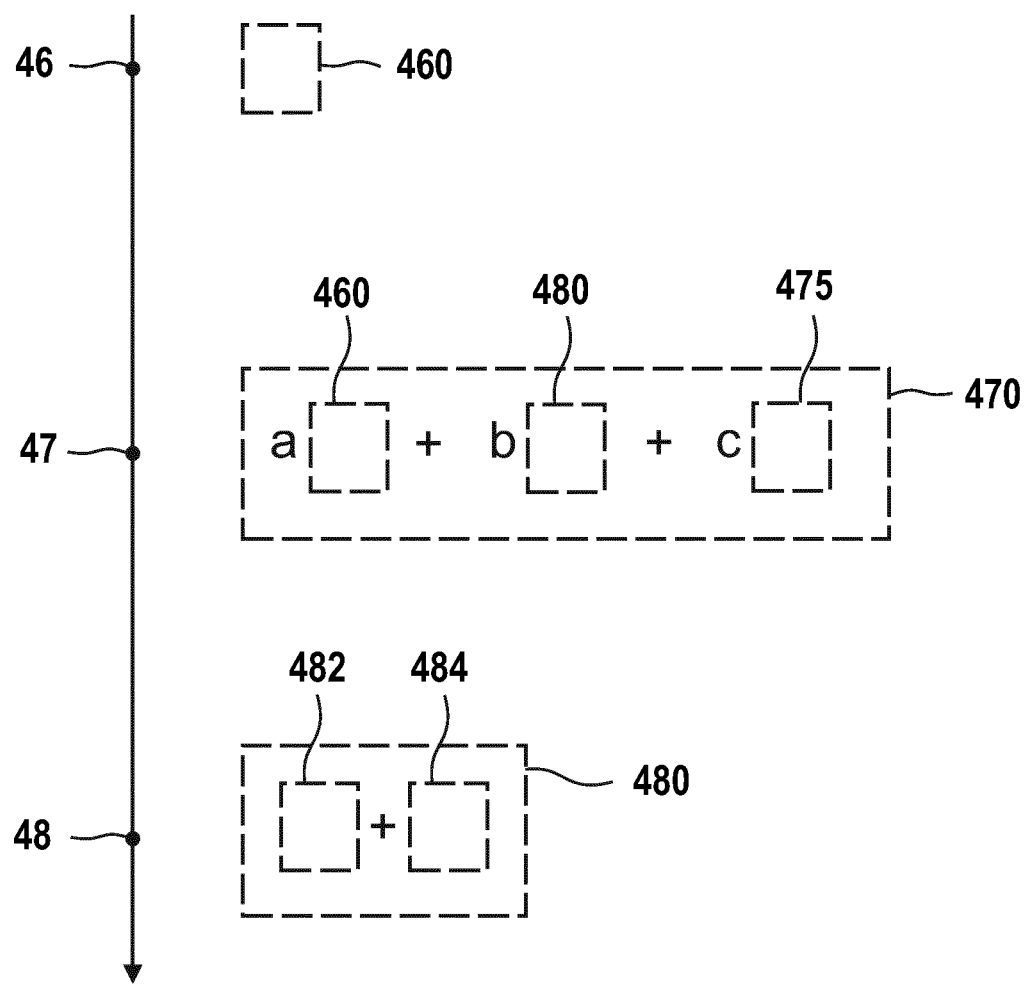
FIG. 3 illustrates the evolution of an initial Hamiltonian into a final Hamiltonian via an intermediate Hamiltonian according to embodiments described herein.

FIG. 3 illustrates the evolution of an initial Hamiltonian 460 into a final Hamiltonian 480 via an intermediate Hamiltonian 470, as performed by the Hamiltonian evolution unit 430. FIG. 3 shows a time axis on which an initial time 46, an intermediate time 47 and a final time 48 are indicated. The intermediate time 47 is between the initial time 46 and the final time 48. For the time axis shown in FIG. 3, time runs downwardly. At the initial time 46, the Hamiltonian evolution unit 430 can provide the initial Hamiltonian 460, that is, the Hamiltonian evolution unit 430. Accordingly, at the initial time 46, the qubits of the quantum system 420 can interact with each other, or with one or more external entities (e.g. magnetic fields) in a manner defined by the initial Hamiltonian 460. At the intermediate time 47, the Hamiltonian evolution unit 430 provides the intermediate Hamiltonian 470. Accordingly, at the intermediate time 47, the qubits can interact with each other or with one or more external entities in a manner defined by the intermediate Hamiltonian 470. At the final time 48, the Hamiltonian evolution unit 430 provides the final Hamiltonian 480. Accordingly, at the final time 48, the qubits can interact with each other or with one or more external entities in a manner defined by the final Hamiltonian 480.

The Hamiltonian evolution unit 430 may evolve the initial Hamiltonian 460 into the final Hamiltonian 480 via the intermediate Hamiltonian 470 by gradually changing the initial Hamiltonian 460 into the intermediate Hamiltonian 470, followed by gradually changing the intermediate Hamiltonian 470 into the final Hamiltonian 480.

In some implementations, the initial Hamiltonian 460 is a single-body Hamiltonian. The initial Hamiltonian can have the form $H^{init} = \Sigma_k a_k \sigma_x^{(k)}$, wherein each $a_k$ is a coefficient and wherein each $\sigma_x^{(k)}$ is a Pauli operator acting on the k-th qubit of the plurality of qubits 100. The Pauli operators $\sigma_z^{(k)}$ and $\sigma_x^{(k)}$ are non-commuting, in particular anti-commuting, Pauli operators. The initial Hamiltonian 460 may be independent of the computational problem 452.

As illustrated in FIG. 3, the intermediate Hamiltonian 470 is a linear combination of the initial Hamiltonian 460, the final Hamiltonian 480 and a first short-range Hamiltonian 475. Representing the initial Hamiltonian 460 as $H^{init}$, the final Hamiltonian 480 as $H^{fin}$ and the first short-range Hamiltonian 475 as $H^{SR1}$, a linear combination (or weighted sum) of these three Hamiltonians has the form $aH^{init} + bH^{fin} + cH^{SR1}$, wherein a, b and c are coefficients (real numbers), as illustrated in FIG. 3. In the intermediate Hamiltonian 470, the coefficients a, b and c can each be different from zero.

In some implementations, the first short-range Hamiltonian 475 can be a single-body Hamiltonian. Particularly, the first short-range Hamiltonian 475 can have the form $\Sigma_k b_k \sigma_y^{(k)}$, wherein each $b_k$ is a coefficient and wherein $\sigma_y^{(k)}$ is a Pauli operator acting on the k-th qubit of the plurality of qubits 100. The Pauli operators $\sigma_x^{(k)}$, $\sigma_y^{(k)}$ and $\sigma_z^{(k)}$ are mutually non-commuting, in particular mutually anti-commuting, Pauli operators.

As illustrated in FIG. 3, the final Hamiltonian 480 is the sum of the problem Hamiltonian 482 and a second short-range Hamiltonian 484. For example, the second short-range Hamiltonian 484 can be a plaquette Hamiltonian representing interactions between groups of qubits corresponding to plaquettes. The plaquettes may, e.g. be elementary squares of a 2-dimensional square lattice according to which the qubits are arranged.

For example, the initial Hamiltonian 460 can be evolved into the final Hamiltonian 480 via the intermediate Hamiltonian 470 according to an interpolation Hamiltonian H(t) which depends on a time parameter t. The interpolation Hamiltonian can have the form $H(t) = A(t)H^{init} + B(t)H^{fin} + H^{SR}(t)$, wherein A(t) and B(t) are interpolation coefficients which depend on the time variable t, and wherein $H^{SR}(t)$ is a short-range Hamiltonian which also depends on the time variable t. For t equal to the initial time $t_{init}$, the interpolation coefficient $A(t_{init})$ may be (exactly or approximately) equal to the initial value 1, the interpolation coefficients $B(t_{init})$ may be (exactly or approximately) equal to the initial value 0, and the short-range Hamiltonian $H^{SR}(t_{init})$ may be (exactly or approximately) equal to the zero operator. Accordingly, for the time parameter t being the initial time $t_{init}$, the interpolation Hamiltonian $H(t_{init})$ can be equal to the initial Hamiltonian $H^{init}$. For t equal to the final time $t_{fin}$, the interpolation coefficient $B(t_{fin})$ may be (exactly or approximately) equal to the final value 1, the interpolation coefficients $A(t_{fin})$ may be (exactly or approximately) equal to the final value 0, and the short-range Hamiltonian $H^{SR}(t_{fin})$ may be (exactly or approximately) equal to the zero operator. Accordingly, for the time parameter t being the final time $t_{fin}$, the interpolation Hamiltonian $H(t_{fin})$ can be equal to the final Hamiltonian $H^{fin}$. For t equal to the intermediate time $t_{int}$, the interpolation coefficients $A(t_{int})$ and $B(t_{int})$ may each be non-zero, and the interpolation Hamiltonian $H(t_{int})$ can be equal to the first short-range Hamiltonian 475 as described. Accordingly, for the time parameter t being the intermediate time $t_{int}$, the interpolation Hamiltonian $H(t_{int})$ can be a linear combination of the initial Hamiltonian 460, the final Hamiltonian 480 and the first short-range Hamiltonian 475.

It shall be understood that the above-discussed example of an interpolation Hamiltonian having the form $H(t)=A(t)H^{init}+B(t)H^{fin}+H^{SR}(t)$ is used for the purpose of illustration and shall not be construed as limiting the scope. Several other examples of interpolation Hamiltonians can be provided.

As mentioned above, the computational problem 452 is encoded in the adjustable parameters of the problem Hamiltonian 482, e.g. the parameters $J_k$ of the exemplary problem Hamiltonian $\Sigma_k J_k \sigma_z^{(k)}$. According to embodiments described herein, the encoding is such that the final Hamiltonian 480, being the sum of the problem Hamiltonian 482 and the second short-range Hamiltonian 484, has a ground state containing information about a solution to the computational problem 452. Accordingly, if the quantum system 420 is in the ground state of the final Hamiltonian 480, or in a state which is close to the ground state, then the information about the computational problem 452 may be revealed by measuring the quantum system 420.

According to embodiments described herein, the Hamiltonian evolution unit 430 can be configured for evolving the quantum system 420 towards a ground state of the final Hamiltonian 480, wherein the plurality of adjustable parameters of the problem Hamiltonian 482 are in the problem-encoding configuration.

FIG. 1 further shows a cooling unit 410 configured for cooling the quantum system 420. The cooling unit 410 may be adapted for cooling the quantum system 420 to an operating temperature of the apparatus 400. The quantum system 420 can be initialized in an initial quantum state by cooling the quantum system 420 towards a ground state of the initial Hamiltonian 460. The Hamiltonian evolution unit 430 can then evolve the initial Hamiltonian 460 into the final Hamiltonian 480 via the intermediate Hamiltonian 470, as described herein. Evolving the initial Hamiltonian 460 into the final Hamiltonian 480 via the intermediate Hamiltonian 470 may be performed while the quantum system 420 is maintained, by the cooling unit 410, at or below substantially the operating temperature of the apparatus 400.

FIG. 1 further shows a measurement device 440 adapted for measuring the quantum system 420. As shown, the measurement device 440 may be adapted for measuring a portion 425 of the qubits of the plurality of qubits 100. Using the measurement device 440, the portion 425 may be measured to obtain a read-out of the final quantum state. The final quantum state, being well-approximated by the ground state of the final Hamiltonian, contains information about the solution to the computational problem 452. The read-out of the final quantum state can reveal the information about the solution. According to the embodiment shown in FIG. 1, the read-out may be provided from the measurement device 440 to the classical computing system 450, as indicated in FIG. 1 by arrow 445. The classical computing system 450 may determine the solution 490 to the computational problem from the readout. The classical computing system 450 may at least determine a trial solution to the computational problem, and verify if the trial solution actually is a solution to the computational problem. For NP problems, the verification is a computation which can be carried out in polynomial time, and can typically be easily computed. If it turns out that no solution to the computational problem was found, the process is repeated until a solution to the computational problem is found.

In light of the above, according to an embodiment, a method of computing a solution to a computational problem using a quantum system comprising a plurality of qubits is provided. The method includes encoding the computational problem into a problem Hamiltonian of the quantum system, wherein the problem Hamiltonian is a single-body Hamiltonian comprising a plurality of adjustable parameters, and wherein the encoding comprises determining, from the computational problem, a problem-encoding configuration for the plurality of adjustable parameters. The method includes evolving an initial Hamiltonian of the quantum system at an initial time into a final Hamiltonian of the quantum system at a final time via an intermediate Hamiltonian of the quantum system at an intermediate time, wherein the intermediate time is between the initial time and the final time. The intermediate Hamiltonian is a linear combination of the initial Hamiltonian, the final Hamiltonian and a first short-range Hamiltonian. The final Hamiltonian is the sum of the problem Hamiltonian and a second short-range Hamiltonian, wherein the plurality of adjustable parameters of the problem Hamiltonian are in the problem-encoding configuration, wherein the second short-range Hamiltonian is a d-body Hamiltonian and d is independent of the computational problem. The method includes measuring at least a portion of the plurality of qubits to obtain a read-out of the quantum system. The method includes determining a solution to the computational problem from the read-out.

Embodiments described herein thus allow determining a solution to a computational problem, e.g. an NP-hard problem, using the quantum system. Compared to determining a solution to a computational problem using solely a classical computing system, i.e., without a quantum system, embodiments described herein may provide a decrease in computational time required for solving the computational problem. In other words, compared to classical computing systems, embodiments described herein may allow solving computational problems faster, or may even enable finding such a solution at all since the computation of the solution may take too long on a classical computing system to compute.

A further advantage relates to the aspect according to which the problem Hamiltonian is a single-body Hamiltonian. While other types of problem Hamiltonians, in particular problem Hamiltonians involving interactions between large groups of qubits or interactions between qubits being distant from each other (long-range interactions), may be infeasible or at least require a very complicated set-up of the quantum system and of the components driving the quantum computation, a single-body problem Hamiltonian, as described herein, can be realized using a much simpler set-up, i.e., a much simpler quantum processing device. In addition, the problem Hamiltonian of the embodiments described herein with its adjustable parameters provides a fully programmable system with which a wide range of computational problems can be encoded. The devices and methods according to embodiments described herein therefore allow for computing a solution to a wide range of computational problems, such as NP-hard problems. Compared to systems where only a limited number of problems can be encoded since certain interactions required by the problem Hamiltonian are hard-wired into the system, an increased flexibility and a much more powerful device and method is thereby provided.

A yet further advantage relates to the aspect according to which the final Hamiltonian is the sum of the problem Hamiltonian and a short-range Hamiltonian (namely the second short-range Hamiltonian). The second short-range Hamiltonian may be a sum of summand Hamiltonians, wherein the summand Hamiltonians may be constraint Hamiltonians as described herein. Having a short-range Hamiltonian provides the advantage that no interactions between distant qubits need to be engineered. This is again in contrast to Hamiltonians requiring long-range interactions that may be infeasible to realize on the quantum system or may at least require a very complicated set-up of the quantum processing device.

A yet further advantage relates according to the aspect according to which the intermediate Hamiltonian is a linear combination of the initial Hamiltonian, the final Hamiltonian and the first short-range Hamiltonian. Particularly, said aspect provides advantages as compared to approaches involving intermediate Hamiltonians that are linear combinations of the initial Hamiltonian and the Final Hamiltonian only, i.e. without the first short-range Hamiltonian. The latter types of intermediate Hamiltonians can arise, e.g., in adiabatic quantum optimization protocols (e.g. quantum annealing protocols) wherein the initial Hamiltonian is evolved into the final Hamiltonian by a linear interpolation Hamiltonian of the form $H(t)=(1-t)H_{init}+tH_{fin}$. By having an intermediate Hamiltonian according to embodiments described herein, a larger space of possible "paths" for evolving the initial into the final Hamiltonian becomes available. This larger space can be exploited to decrease the time needed for evolving the initial Hamiltonian into the final Hamiltonian. Accordingly, a faster runtime for solving the computational problem can be provided.

In particular, by passing via an intermediate Hamiltonian which is a linear combination of the initial Hamiltonian, the final Hamiltonian and the first short-range Hamiltonian, it is possible to evolve the initial Hamiltonian into the final Hamiltonian according to a diabatic process (or non-adiabatic process, or counter-diabatic process) while staying sufficiently close to the ground state of the quantum system throughout the evolution.

Without wishing to be bound by any particular theory, according to the adiabatic theorem of quantum mechanics, a quantum system starting out in a ground state of an initial Hamiltonian and subjected to a time-dependent Hamiltonian evolution will stay in an instantaneous ground state of the quantum system (or very close thereto) provided that the time evolution of the Hamiltonian is performed sufficiently slowly. By such adiabatic quantum processes, it is possible to solve computational problems, namely by adiabatically evolving an initial Hamiltonian into a final Hamiltonian in order to prepare a ground state of the final Hamiltonian. Yet, since the permitted speed of such adiabatic processes (also called quantum annealing processes) is limited in light of the adiabatic theorem, the runtime of the quantum computation will typically be high, particularly it may scale exponentially with the size the computational problem. In contrast, embodiments described herein allow circumventing the speed limitations imposed by the adiabatic theorem, by using an intermediate Hamiltonian which is a linear combination of the initial Hamiltonian the final Hamiltonian and the first short-range Hamiltonian. For example, a first short-range Hamiltonian having the form $\Sigma_k b_k \Sigma_y^{(k)}$, wherein $\sigma_y^{(k)}$ is a Pauli operator of a k-th qubit, can be used. The inventors have found that, by passing via an intermediate Hamiltonian according to embodiments described herein, the evolution from the initial Hamiltonian to the final Hamiltonian can be carried out diabatically, i.e. faster than the speed allowed by the adiabatic theorem, while still reaching a ground state which is close to the ground state of the final Hamiltonian. Hence, an improved runtime of the computation can be provided.

Embodiments described herein provide for a scalable architecture for computing solutions to computational problems. For a given quantum system, solutions to a wide variety of computational problems of a certain maximal size can be computed, wherein the maximal size is determined by the number of qubits of the quantum system. To compute solutions of computational problems beyond this maximal size, a larger quantum system, i.e. a quantum system containing a larger number of qubits, can be provided, with e.g. a corresponding problem Hamiltonian, short range Hamiltonian and final Hamiltonian according to embodiments described herein, to treat computational problems of a larger size. By choosing a quantum system having a suitably large number of qubits, solutions can thus be computed for computational problems of any desired size. Irrespective of the number of qubits of the quantum system, the problem Hamiltonian is a single-body Hamiltonian, the final Hamiltonian is the sum of the problem Hamiltonian and a second short-range Hamiltonian, and the intermediate Hamiltonian is a linear combination of the initial Hamiltonian, the final Hamiltonian and a first short-range Hamiltonian, according to embodiments described herein. Accordingly, a scalable architecture for computing solutions to computational problems is provided.

According to some embodiments, the computational problem may be a decision problem. A decision problem may refer to a computational problem being formulated as a yes/no question. The solution to a decision problem may be either "yes" or "no". Alternatively, the solution to a decision problem may be a single classical bit, i.e. either 0 or 1. According to other embodiments, the computational problem may be formulated in a manner different from a decision problem.

The computational problem may be any one of a variety of computational problems considered in, e.g., the fields of computer science, physics, chemistry or engineering. For the purpose of explanation, but without intending to limit the scope, three examples of computational problems are discussed in the following. The three examples discussed below are examples of decision problems.

A first example of a computational problem according to embodiments described herein is the "traveling salesmen problem". The traveling salesman problem involves a first list of cities and a second list of distances between each pair of cities in the first list. The traveling salesman problem asks the following question: "Given the first list, the second list and a constant K, does there exist a tour of length at most K, wherein the tour (i) visits each city in the first list exactly once and (ii) returns to the city in which the tour starts?"

A second example of a computational problem according to embodiments described herein is the "3-colorability problem" relating to coloring of mathematical graphs. A mathematical graph may include a set of vertices and a set of edges representing connections between pairs of vertices. A 3-coloring of a mathematical graph is an assignment of each vertex of the mathematical graph to one of three possible colors (say, "red", "green" or "blue") wherein any pair of vertices connected by an edge are assigned to different colors. For some mathematical graphs, a 3-coloring may not exist. The 3-colorability problem asks the question: "Given a mathematical graph, does there exist a 3-coloring?"

A third example of a computational problem according to embodiments described herein relates to the Ising spin model. The Ising spin model is a physics model representing interactions between a plurality of spins $s_1, s_2, \ldots, s_n$, wherein each spin $s_i$ is a variable which can have either the value 1 or the value −1, with i ranging from 1 to n. For the plurality of spins, an Ising energy function $H(s_1, s_2, \ldots, s_n)$ may be considered, wherein the Ising energy function has the form $$H(s_1, s_2, \ldots, s_n) = \Sigma_{ij} c_{ij} s_i s_j + \Sigma_i c_i s_i$$

wherein each $c_{ij}$ is a coupling coefficient and each $c_i$ is a field coefficient. The Ising energy function involves pair-wise interactions, wherein a pair-wise interaction between spins $s_i$ and $s_j$ is represented by the term $c_{ij} s_i s_j$ in the Ising energy function. The absolute value of the coupling coefficient $c_{ij}$ reflects the strength of the pairwise interaction between the spins $s_i$ and $s_j$. The sign of the coupling coefficient $c_{ij}$ reflects the nature of the pairwise interaction, e.g. ferromagnetic or antiferromagnetic interactions. The Ising spin model may be a long-range Ising spin model. A long-range Ising spin model may include interactions between pairs of spins which are distant from each other according to a distance measure. A long-range Ising spin model may include interactions between pairs of spins which are distant from each other by a distance being at least the logarithm of the maximal distance between two spins. Some long-range Ising spin models, e.g. all-to-all Ising spin models, may involve interactions between all pairs of spins. For example, an Ising spin model where each of the coupling coefficients $c_{ij}$ is non-zero may be considered to be a long-range Ising spin model.

The Ising energy function further includes terms $c_i s_i$ representing an interaction between a spin $s_i$ and an external field influencing the spin $s_i$ but not influencing the other spins. The strength and direction of the field influencing the spin si are represented by the absolute value and the sign of the field coefficient $c_i$, respectively. A computational problem associated with the Ising spin model, referred to herein as the Ising spin model problem, can be formulated as follows: "Given a set of coupling coefficients $c_{ij}$, a set of field coefficients $c_i$ and a constant K, does there exist a configuration $(s_1, s_2, \ldots, s_N)$ of the spins such that $H(s_1, s_2, \ldots, s_n)$ is smaller than K?".

According to embodiments described herein, the computational problem may include a plurality of input variables. The plurality of input variables may represent information regarding the computational problem to be solved. For example, referring to the three examples of computational problems described above, the plurality of input variables may include: the first list of cities and the second list of distances (for the traveling salesman problem); the sets of vertices and edges of a graph (for the 3-colorability problem); the sets of coupling coefficients $c_{ij}$ and field coefficients $c_i$ (for the Ising spin model problem).

The size of a computational problem may be understood as a measure for the number of classical information units required to specify the computational problem. The size of a computational problem may depend on the number of input variables of the computational problem. The size of a computational problem may increase as the number of input variables increases. The size of the computational problem may be equal to the number of input variables. For example, for the traveling salesman problem, the size may refer to the sum of the lengths of the first list and the second list. As a further example, for the Ising spin model problem, the size may refer to the number n of spins $s_i$.

A computational problem, as described herein, may relate to the complexity class NP considered in the field of computer science, wherein "NP" stands for "nondeterministic polynomial time". The computational problem can belong to the complexity class NP. The complexity class NP comprises decision problems. Informally speaking, for a computational problem belonging to the complexity class NP, there exists a set of witness variables on the basis of which it is possible to verify that the solution to the computational problem is "yes". Therein, for computational problems in NP, the process of verifying that the solution is "yes" can be carried out by a verification algorithm having a runtime which scales only polynomially with the size of the computational problem. In other words, the set of witness variables contains information about the solution, wherein the information may be processed in polynomial runtime by the verification algorithm to verify that the solution is "yes". For a formal definition of the complexity class NP, reference is made to the relevant computer science literature.

For example, the traveling salesman problem, the 3-colorability problem and the Ising spin model problem, as described herein, are examples of decision problems in the complexity class NP. For example, consider the Ising spin model problem. If the solution to the Ising spin model problem for a given set of coupling coefficients and field coefficients and for a given constant K is "yes", then a configuration of spins $(s_1, s_2, \ldots, s_n)$ for which the associated Ising energy function $H(s_1, s_2, \ldots, s_n)$ is smaller than K may be regarded as a set of witness variables. Given the witness variables $(s_1, s_2, \ldots, s_n)$, it may be verified in polynomial time that the energy $H(s_1, s_2, \ldots, s_n)$ is indeed smaller than K, by computing the number $H(s_1, s_2, \ldots, s_n)$ and comparing it with K. Accordingly, the Ising spin model problem is contained in the complexity class NP.

For some computational problems in NP, the task of computing a solution (which is "yes" or "no" for a decision problem) may not have a polynomial time algorithm or may even have an exponential runtime, whereas the verification algorithm has a polynomial runtime. It is considered that some computational problems in the complexity class NP are computationally intractable for classical computing systems. Therein, the terminology of a "computationally intractable" computational problem may refer to a computational problem for which there does not exist an algorithm, running on a classical computing system with polynomial runtime, to determine whether the solution to the computational problem is "yes" or "no". In particular, the traveling salesman problem, the 3-colorability problem and the Ising spin model problem, are considered intractable for classical computing systems, or at least no algorithm is known to solve any of these problems in polynomial runtime.

The computational problem for which a solution is computed using the quantum system, as described herein, can be an NP-complete problem or an NP-hard problem. NP-complete problems belong to the class NP and are considered computationally intractable for classical computing systems. Although not every NP-hard problem belongs to NP, NP-hard problems are also considered to be computationally intractable for classical computing systems.

The method according to embodiments described herein includes encoding a computational problem into a problem Hamiltonian of the quantum system, wherein the encoding comprises determining, from the computational problem, a problem-encoding configuration for the plurality of adjustable parameters of the problem Hamiltonian. The computational problem may be mapped onto a corresponding problem-encoding configuration of the plurality of adjustable parameters of the problem Hamiltonian. The problem-encoding configuration may contain information about the computational problem. The act of determining the problem-encoding configuration may include determining and/or computing a value for each of the plurality of adjustable parameters.

The method according to embodiments described herein may include providing the computational problem, or at least information regarding the computational problem, to a classical computing system, such as e.g. classical computing system 450 shown in FIG. 1. For example, a plurality of input variables of the computational problem, as described herein, may be provided to the classical computing system. The classical computing system may be configured for computing the problem-encoding configuration from the computational problem, e.g. from a plurality of input variables of the computational problem.

Different computational problems may be encoded into the problem Hamiltonian by determining corresponding different problem-encoding configurations. For example, a first computational problem and a second computational problem may be encoded into the problem Hamiltonian, leading to a first problem-encoding configuration and a second problem-encoding configuration for the plurality of adjustable parameters of the problem Hamiltonian. If the second computational problem is different from the first computational problem, the second problem-encoding configuration of the adjustable parameters may be different from the first problem-encoding configuration.

Determining the problem-encoding configuration of the plurality of adjustable parameters of the problem Hamiltonian may include mapping the computational problem onto an auxiliary computational problem. The mapping may be performed by a classical computing system as described herein.

The auxiliary computational problem may include determining a ground state of a spin model, particularly a long-range spin model. The long-range spin model may be a long-range spin model with m-body interactions, wherein m is 1, 2 or 3. The auxiliary computational problem as described herein may be the Ising spin model problem.

The auxiliary computational problem depends on the computational problem. Mapping the computational problem onto the auxiliary computational problem may include mapping input parameters of the computational problem onto input parameters of the auxiliary computational problem. The mapping of the computational problem onto the auxiliary problem may be such that a solution for the computational problem may be determined from a solution to the auxiliary computational problem.

As described above, the computational problem may be a problem in the complexity class NP, e.g., the traveling salesman problem. Since the Ising spin model problem is an NP-complete problem, every problem in the complexity class NP, such as e.g., the traveling salesman problem, may be mapped onto the Ising spin model problem. For example, for the traveling salesman problem including a first list and a second list, as described herein, the first list and the second list may be mapped onto a set of coupling coefficients and field coefficients for the Ising spin model problem. A solution for the traveling salesman problem may be computed from a solution for the Ising spin model problem with the corresponding coupling coefficients and field coefficients. Such mappings are known.

Determining the problem-encoding configuration of the plurality of adjustable parameters of the problem Hamiltonian may include determining the problem-encoding configuration from the auxiliary computational problem, wherein the auxiliary computational problem is a spin model, e.g. an Ising spin model. The problem-encoding configuration may be determined from the auxiliary computational problem by a classical computing system as described herein.

One specific way to determine the problem-encoding configuration of the plurality of adjustable parameters of the problem Hamiltonian is described in more detail further below with respect to FIGS. 10-17.

The method according to embodiments described herein can include determining, e.g. by a classical computing system as described herein, the second short-range Hamiltonian from a plurality of closed loops of spins in the long-range spin model. A specific way of performing this determination is described further below in relation to FIGS. 10-17.

According to embodiments described herein, a solution to the computational problem is computed using the quantum system comprising the plurality of qubits. The plurality of qubits may comprise at least 3 qubits, in particular at least 8 qubits. Additionally or alternatively, the plurality of qubits may include N qubits, wherein N is between 100 and 10.000 qubits, preferably even more than 10.000 qubits. It shall be understood that the plurality of qubits 100 shown in the figures described herein are shown for illustrational and explanatory purposes, and the actual number of qubits may depart therefrom.

Figure 4:
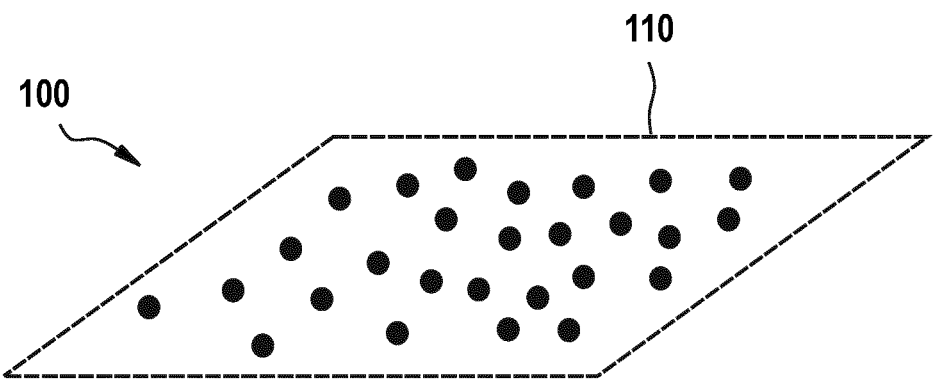
FIGS. 4-6 show examples of possible arrangements of a plurality of qubits according to embodiments described herein.
Figure 5:
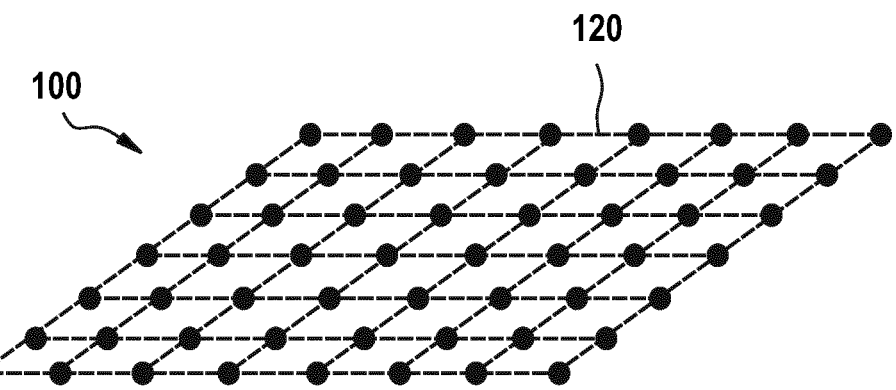
Figure 6:
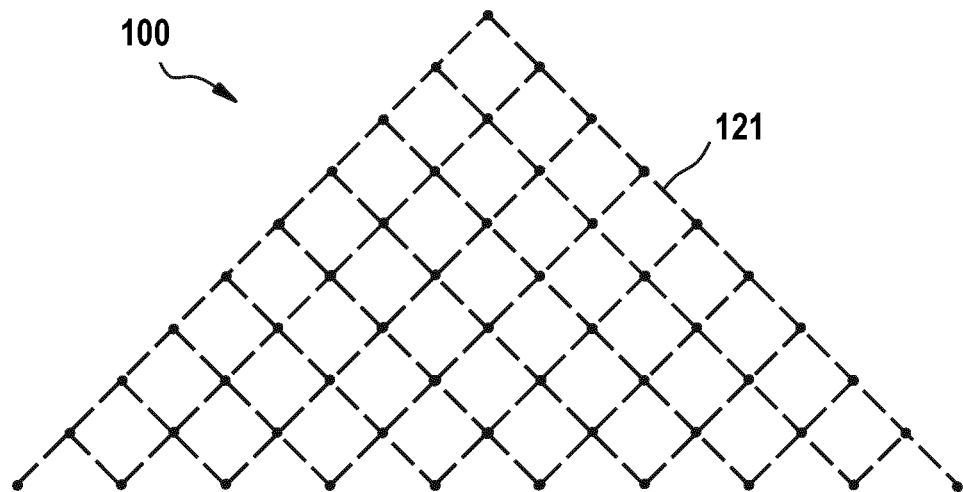

The qubits of the quantum system may be arranged on a 2-dimensional surface or on a 3-dimensional surface, which may be planar or may include curvature. FIGS. 4-6 show different spatial arrangements of the plurality of qubits 100 according to embodiments described herein. These spatial arrangements may be the layouts of quantum computing devices, e.g., quantum chips on which the qubits and/or other individual quantum systems (qlevel systems such as qutrits) may be embodied. As shown in FIG. 4, the plurality of qubits 100 may be arranged according to a 2-dimensional planar surface 110, as indicated in FIG. 4 by the dashed lines. It shall be understood that the 2-dimensional surface 110 shown in FIG. 4 is drawn for the purpose of visually representing a 2-dimensional spatial arrangement of the plurality of qubits, but the 2-dimensional surface 110 need not be a physical, tangible surface on which the plurality of qubits 100 are arranged. Similar considerations apply to embodiments according to which the plurality of qubits is arranged according to a 2-dimensional lattice or a 3-dimensional lattice, as described below.

According to further embodiments, and as shown in FIG. 5, the plurality of qubits 100 may be arranged according to a 2-dimensional lattice 120, as indicated by the dashed lines. A lattice, such as e.g. a 2-dimensional lattice or a 3-dimensional lattice, may include a plurality of nodes spatially arranged according to a regular grid. In FIG. 5, the plurality of qubits 100, represented by the plurality of black dots, correspond to the nodes of the 2-dimensional lattice 120. As shown, each qubit of the plurality of qubits 100 may be arranged at a node of the 2-dimensional lattice 120. In the exemplary embodiment shown in FIG. 5, the 2-dimensional lattice 120 is a 2-dimensional square lattice. According to alternative embodiments, the 2-dimensional lattice 120 may, e.g., be a hexagonal lattice or triangular lattice, or any other type of 2-dimensional lattice.

According to embodiments, the plurality of qubits may be arranged according to a 3-dimensional lattice. Similar to the discussion provided in reference to FIG. 5, the plurality of qubits may correspond to the nodes of the 3-dimensional lattice. Each qubit of the plurality of qubits may be arranged at a node of the 3-dimensional lattice. The 3-dimensional lattice may be a 3-dimensional square lattice. As was the case for 2-dimensional lattices, other types of 3-dimensional lattices may also be considered.

A 2-dimensional lattice is a planar structure, which may provide a simpler spatial arrangement of the qubits as compared to, e.g., a 3-dimensional lattice or some irregular spatial arrangement.

According to embodiments, the plurality of qubits may be arranged according to a portion of a 2-dimensional lattice or according to a portion of a 3-dimensional lattice. FIG. 6 illustrates an exemplary embodiment according to which the plurality of qubits 100 is arranged according to a triangular-shaped portion 121 of a 2-dimensional lattice. FIG. 6 shows a top view of the triangular-shaped portion 121. A triangular shaped portion corresponds to the layout of a quantum computing device according to some embodiments which are configured for carrying out the methods described herein. Portions of lattices having a different shape may be considered as well.

Some of the Hamiltonians considered in the present disclosure are single-body Hamiltonians. For example, the problem Hamiltonian is a single-body Hamiltonian and, in some implementations, the initial Hamiltonian and/or the first short-range Hamiltonian can be single body-Hamiltonians.

A single-body Hamiltonian of the quantum system, as described herein, may be understood as a Hamiltonian wherein no interactions occur between groups of two or more qubits. A single-body Hamiltonian may be the sum of a plurality of summand Hamiltonians. Each summand Hamiltonian may act on a single qubit of the plurality of qubits. A single-body Hamiltonian may have the form $H=\Sigma_i H_i$ wherein each $H_i$ is a summand Hamiltonian acting solely on the i-th qubit. A single-body Hamiltonian may represent interactions between the plurality of qubits and an external entity, e.g. a magnetic field or an electric field, wherein each qubit interacts individually with the external entity.

Figure 7:
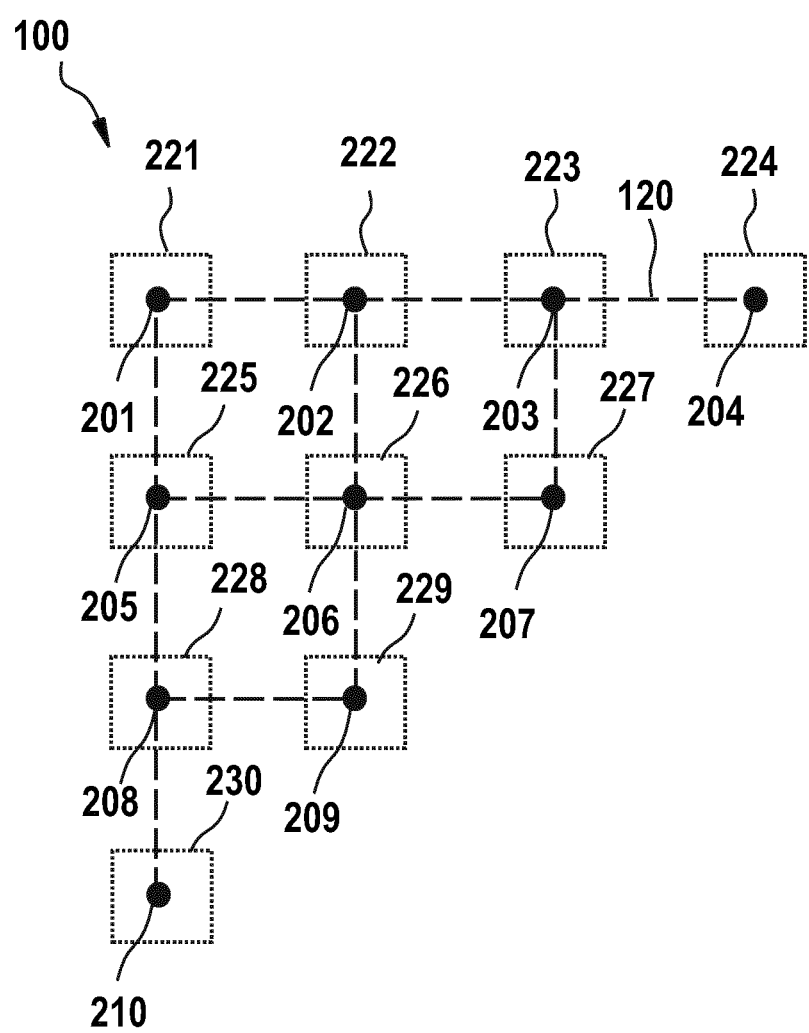
FIG. 7 illustrates the notion of a single-body Hamiltonian according to embodiments described herein.

FIG. 7 shows a schematic illustration of a single-body Hamiltonian according to embodiments described herein. For the sake of concreteness, but without intending to limit the scope, the plurality of qubits shown in FIG. 7 includes 10 qubits, namely qubits 201 through 210, arranged in a portion of a 2-dimensional square lattice that forms a triangle, similar as in FIG. 6. The single-body Hamiltonian described with reference to FIG. 7 is the sum of 10 summand Hamiltonians 221 through 230. In FIG. 7, each of the summand Hamiltonians 221 through 230 is schematically drawn as a square surrounding a single qubit, indicating that each summand Hamiltonian acts on a single qubit. For example, summand Hamiltonian 221 is represented as a square surrounding qubit 201 and qubit 201 alone, indicating that summand Hamiltonian 221 acts on qubit 201 but does not act on any of the remaining qubits 202 to 210.

For a quantum system including a plurality of superconducting qubits, a single-body Hamiltonian can be realized by a plurality of magnetic fluxes interacting with the plurality of superconducting qubits. A magnetic flux or magnetic flux bias may extend through the primary superconducting loop and through the secondary superconducting loop of a superconducting qubit. For example, in relation to the problem Hamiltonian, the plurality of adjustable parameters of the problem Hamiltonian can be adjusted by adjusting the plurality of magnetic fluxes or magnetic flux biases.

For a quantum system realized with trapped ions, individual ions can be addressed by spatial separation or separation in energy. The case of spatial separation involves using a laser beam that has passed through and/or has been reflected from an acousto-optical deflector, an acousto-optical modulator, micromirror devices, or the like. The case of separation in energy involves using a magnetic field gradient that changes internal transition frequencies, allowing selection through energy differences, i.e., detunings of the applied fields. A single-body Hamiltonian can be realized by laser fields or microwaves resonant or off-resonant with the internal transition or by spatial magnetic field differences.

For a quantum system realized with quantum dots, a single-body Hamiltonian can be realized with electric fields.

For a quantum system realized with NV centers, using magnetic resonance through the application of microwave pulses, qubit states can be coherently manipulated on nanosecond timescales. Selective manipulation of the qubit states can also be achieved conditional on the state of the close-by nuclear spins.

The problem Hamiltonian, being a single-body Hamiltonian, may have the form $H=\Sigma_i H_i$ wherein each $H_i$ is a summand Hamiltonian acting solely on the i-th qubit. The plurality of adjustable parameters of the problem Hamiltonian may include a plurality of adjustable parameters of the summand Hamiltonians. One or more summand Hamiltonians of the single-body Hamiltonian, in particular each of the summand Hamiltonians, may include one or more adjustable parameters.

For example, the problem Hamiltonian may have the form $\Sigma_k J_k \sigma_z^{(k)}$, wherein $\sigma_z^{(k)}$ is a Pauli operator of a k-th qubit of the plurality of qubits, wherein each $J_k$ is a coefficient, and wherein the coefficients $J_k$ form the plurality of adjustable parameters of the single-body Hamiltonian. The Pauli operator $\sigma_z^{(k)}$ may be a Pauli operator associated with a first spatial direction ("z-direction").

An adjustable parameter of the problem Hamiltonian, as described herein, may be a parameter representing a strength and/or a direction of an interaction between a qubit of the plurality of qubits and an external entity. The external entity may, e.g., include at least one of the following: one or more magnetic fields; one or more electric fields, and/or one or more Laser fields, Microwaves, or phase shifts from mechanical deformations. Adjusting an adjustable parameter of the problem Hamiltonian may be realized by adjusting the external entity and/or by adjusting the strength and/or type of interaction between the qubit and the external entity. Accordingly, the adjustable parameter may represent an adjustable interaction, e.g. an interaction which is not hard-wired in the quantum system.

The plurality of adjustable parameters of the problem Hamiltonian may include a plurality of field strengths and/or a plurality of field directions of single-body fields acting on the plurality of qubits. The fields acting on the plurality of qubits may include one or more magnetic fields and/or one or more electric fields, e.g. in embodiments relating to superconducting qubits.

A single-body field may be understood as a field influencing a single qubit in the plurality of qubits. According to embodiments, the plurality of single-body fields may include different single-body fields influencing the corresponding qubits according to possibly different field strengths and/or possibly different field directions. For example, a first single-body field and a second single-body field may influence a first qubit and a second qubit, respectively, in the plurality of qubits. Therein, the first single body field and the second single-body field, both being e.g. magnetic fields, may have different field strengths and/or field directions.

In some implementations, the initial Hamiltonian may be a single-body Hamiltonian. Having an initial Hamiltonian which is a single-body Hamiltonian allows for a simple set-up to realize the initial Hamiltonian, e.g. for a quantum system of superconducting qubits.

The initial Hamiltonian may be a single-body Hamiltonian having the form $H^{init}=\Sigma_k a_k \sigma_x^{(k)}$. Therein, $a_k$ may be a coefficient for a k-th qubit in the plurality of qubits and $\sigma_x^{(k)}$ may be Pauli operator acting on the k-th qubit. In particular, $\sigma_x^{(k)}$ may be a Pauli operator corresponding to a second spatial direction ("x-direction"). The second spatial direction may be orthogonal to the first spatial direction as described herein. The Pauli operator $\sigma_x^{(k)}$ and the Pauli operator $\sigma_z^{(k)}$ may be non-commuting, in particular anti-commuting, operators. According to embodiments, each of the coefficients $a_k$ is equal to a single common coefficient h. The initial Hamiltonian may be a single-body Hamiltonian having the form $H^{init}=h\Sigma_k \sigma_x^{(k)}$.

For a superconducting qubit, a magnetic flux bias through the primary superconducting loop of the superconducting qubit may be set such that the basis states |0> and |1> have the same energy, i.e. the energy difference for these basis states is zero. Further, a magnetic flux bias through the secondary superconducting loop can couple the basis states |0> and |1>. Accordingly, a summand Hamiltonian of the form $h\sigma_x^{(k)}$ can be realized for the superconducting qubit. Accordingly, an initial Hamiltonian of the form $H^{init}=h\Sigma_k \sigma_x^{(k)}$ can be realized for a plurality of superconducting qubits. A ground state of the initial Hamiltonian can be occupied with near certainty by setting the coefficient h to a value which is much larger than the energy scale determined by the temperature of the quantum system.

For a quantum system realized with trapped ions, the ions can be initialized by optical pumping using a laser, which deterministically transfers the ions into one the two quantum basis states of a qubit. This reduces entropy and is therefore a cooling on the internal states.

For a quantum system realized with cold atoms, the initial quantum state may be prepared by exciting atoms being in their ground state to a Rydberg state with a large detuning.

For a quantum system realized with NV Centers, the NV Centers may be addressed individually by using standard optical confocal microscopy techniques. Initialization and measurement can be performed by off-resonant or resonant optical excitation.

A short-range Hamiltonian as described herein, such as e.g. the first short-range Hamiltonian or the second short-range Hamiltonian, may be understood as a Hamiltonian representing interactions of the plurality of qubits, wherein no interactions occur between qubits which are distanced from each other by a distance greater than an interaction cut-off distance. The interaction cut-off distance may be a constant distance. The interaction cut-off distance may be much smaller than a maximal qubit distance between the qubits in the plurality of qubits. For example, the interaction cut-off distance may be 30% or below of the maximal qubit distance, in particular 20% or below, more particularly 10% or below. For a plurality of qubits arranged according to a lattice, a short-range Hamiltonian may be an r-range Hamiltonian, wherein no interactions occur between qubits which are distanced from each other by a distance greater than r times an elementary distance (lattice constant) of the lattice. Therein, r may be from 1 to 5, e.g. r=√2, 2, 3, 4 or 5. The notion of an elementary distance of a lattice according to embodiments described herein is illustrated below in reference to e.g. FIGS. 8 and 9.

Irrespective of the number of qubits of the quantum system, a plaquette Hamiltonian and a pairwise nearest-neighbor Hamiltonian of the quantum system, as described herein, shall be regarded as short-range Hamiltonians.

An example of a short-range Hamiltonian is a single-body Hamiltonian. For a single-body Hamiltonian, the interaction cut-off distance may be considered to be zero, since there are no interactions between groups of two or more qubits but only interactions between individual qubits and an external entity, e.g. a magnetic field or an electric field.

The initial Hamiltonian, as described herein, can be a short-range Hamiltonian.

Figure 8:
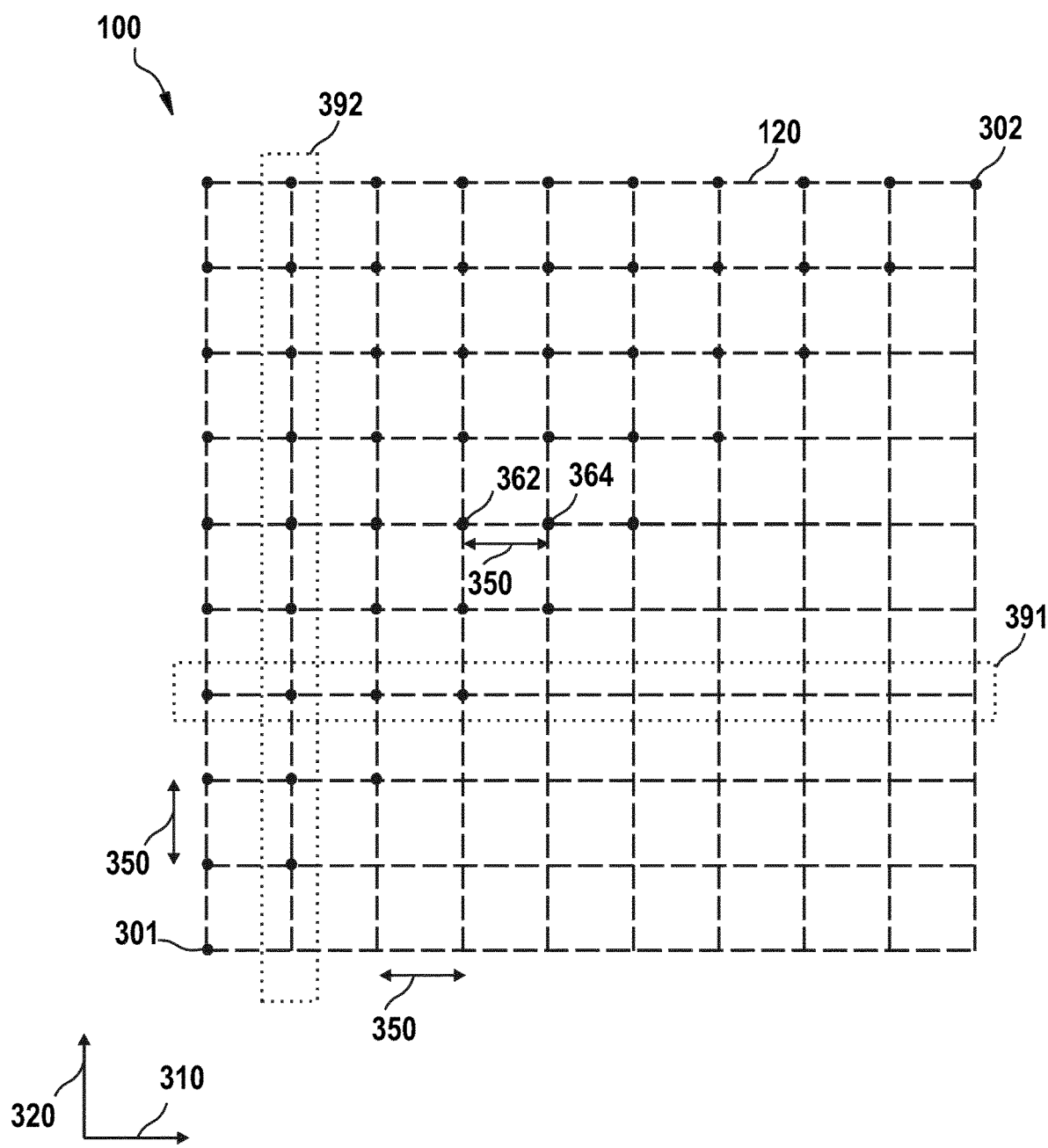
FIGS. 8-9 illustrate the notion of a short-range Hamiltonian according to embodiments described herein.
Figure 9:
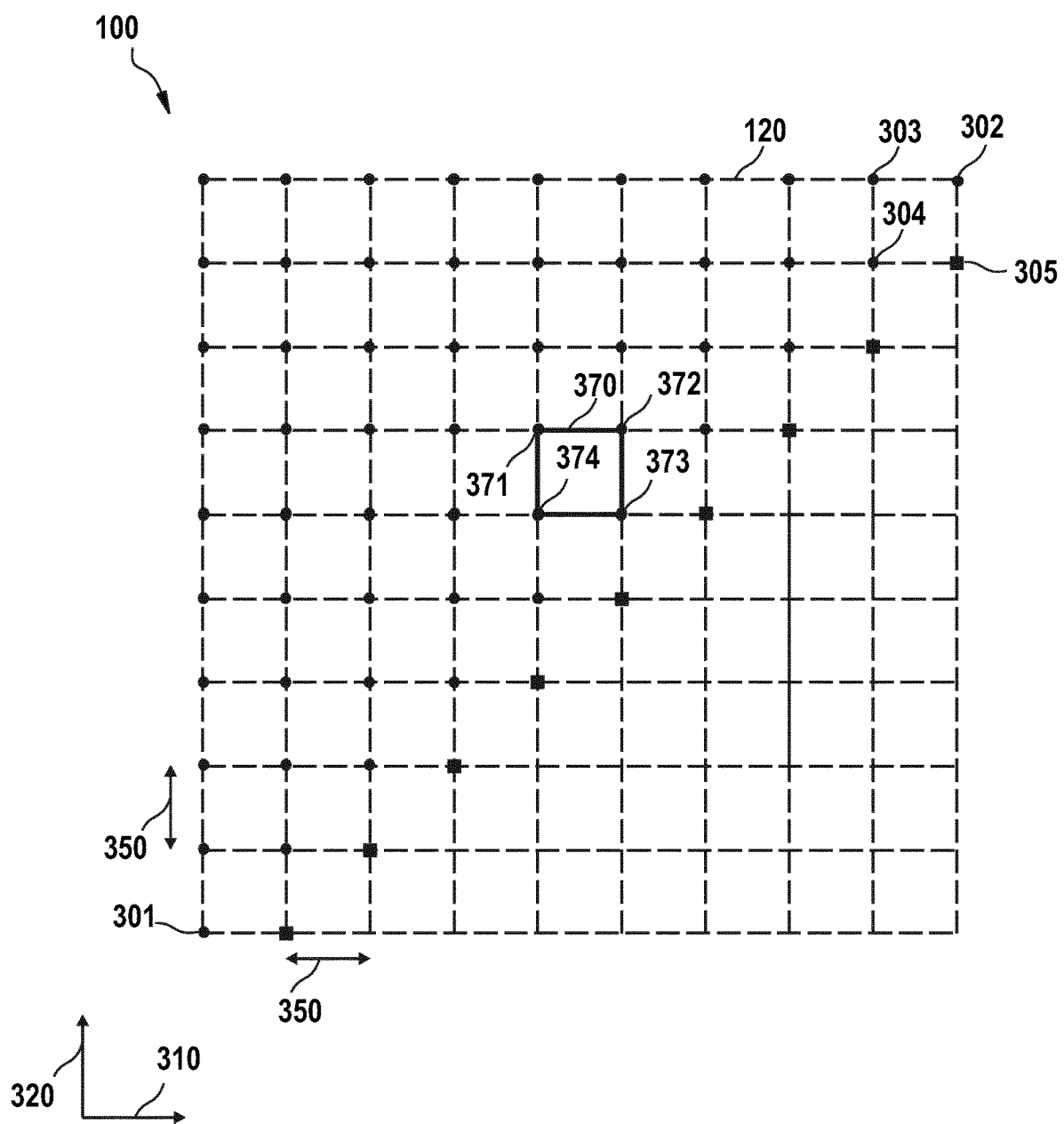

FIGS. 8 and 9 show further examples of short-range Hamiltonians for embodiments in which the plurality of qubits 100 is arranged according to a 2-dimensional square lattice 120, and lie at positions of nodes of the 2-dimensional square lattice that form a triangle portion of the 2-dimensional square lattice. For the sake of concreteness, but without intending to limit the scope, the exemplary 2-dimensional square lattice 120 shown in FIGS. 8 and 9 includes 55 qubits arranged in a triangle within a square 10×10 lattice comprising 10 rows and 10 columns. When traversing any row of qubits of the 2-dimensional lattice 120 along the x-direction 310, e.g. row 391 as indicated by the dotted lines, the consecutive qubits in the row are arranged at an elementary distance D from each other, which is also called a lattice constant in x-direction. The elementary distance D is indicated with reference numeral 350. Similarly, when traversing any column of qubits of the 2-dimensional lattice 120 along the y-direction 320, e.g. column 392, the consecutive qubits in the column are at an elementary distance, which is also called lattice constant in y-direction. In FIGS. 8 and 9, the elementary distances (lattice constants) in x-direction and y-direction are the same. However, the lattice constants in x-direction and in y-direction could also be different. As shown, the x-direction 310 is perpendicular to the y-direction 320. The maximal qubit distance of the plurality of qubits 100 shown in FIG. 8 and FIG. 9 is the distance between qubits 301 and 302. The maximal qubit distance is equal to (9√2)D.

An example of a short-range Hamiltonian described with reference to FIG. 8 is a pairwise nearest-neighbor Hamiltonian. A pairwise nearest-neighbor Hamiltonian may involve only interactions between pairs of neighboring qubits on the 2-dimensional lattice 120, wherein a pair of neighboring qubits may refer to a pair of qubits distanced from each other at the elementary distance D. Qubits 362 and 364 shown in FIG. 8 form an example of a pair of neighboring qubits. A pairwise nearest-neighbor Hamiltonian may be the sum of a plurality of summand Hamiltonians, wherein each summand Hamiltonian represents an interaction between a pair of neighboring qubits. For a pairwise nearest-neighbor Hamiltonian described in reference to FIG. 8, the interaction cut-off distance is equal to the elementary distance D. Accordingly, the interaction cut-off distance is much smaller compared to the maximal qubit distance, namely the interaction cut-off distance D is below 10% of the maximal qubit distance.

An example of a short-range Hamiltonian described with reference to FIG. 9 is a plaquette Hamiltonian. In FIG. 9, 55 qubits shown as black circles are again arranged in a 2-dimensional square lattice 120 and form a triangle therein. A plaquette of the 2-dimensional square lattice 120 is an elementary square of the 2-dimensional square lattice 120, as illustrated in FIG. 9 with reference numeral 370. The plaquette 370 comprises qubits 371, 372, 373 and 374, wherein qubit 371 is arranged at the elementary distance D from qubit 372 and from qubit 374, and wherein qubit 373 is also arranged at the elementary distance D from qubits 372 and 374. Additionally, auxiliary qubits shown with black rectangles are added in a further line so as to complete the plaquettes of the qubits. For instance, auxiliary qubit 305 completes the plaquette of qubits 302, 303 and 304. The auxiliary qubits can be prepared in a specific quantum state, e.g., |1>. For this lattice geometry, a plaquette Hamiltonian may involve only interactions between groups of four qubits, or groups of three qubits and one ancillary qubit, corresponding to plaquettes of the 2-dimensional square lattice 120. A plaquette Hamiltonian may be the sum of a plurality of summand Hamiltonians. Each summand Hamiltonian may represent an interaction corresponding to a plaquette of qubits on the lattice, or an interaction corresponding to a plaquette of qubits and an auxiliary qubit. Alternatively, no auxiliary qubits may be used, and the plaquette Hamiltonian then includes summand Hamiltonians describing interactions between only three qubits. For a plaquette Hamiltonian described with reference to FIG. 9, the interaction cut-off distance is $\sqrt{2}D$ since the maximal distance between two qubits in a plaquette is $\sqrt{2}D$. For example, the distance between qubits 371 and 373 is $\sqrt{2}D$. Accordingly, the interaction cut-off distance is much smaller compared to the maximal qubit distance, namely the interaction cut-off distance $\sqrt{2}D$ is below 12% of the maximal qubit distance.

The plurality of qubits may be arranged according to a 2-dimensional lattice. A short-range Hamiltonian as described herein, such as e.g. the first short-range Hamiltonian and/or the second short-range Hamiltonian, may involve interactions between groups of four qubits corresponding to plaquettes of the 2-dimensional lattice. A short-range Hamiltonian may be a plaquette Hamiltonian.

For a quantum system including a plurality of superconducting qubits, a plaquette Hamiltonian can be realized using a plurality of ancillary qubits, wherein an ancillary qubit may be arranged inside each plaquette, e.g. at the center of each plaquette. Interactions between qubits of the form $K_{km}\Sigma_z^{(k)}\sigma_z^{(m)}$ can be realized by a coupling unit, e.g. an inductive coupling unit, as described herein. The coupling unit includes a superconducting quantum interference device. Applying an adjustable magnetic flux bias to the superconducting quantum interference device allows tuning the coefficient $K_{km}$. A summand Hamiltonian of the plaquette Hamiltonian can then be realized by $H_{sr,p}=C(\sigma_z^{(1)}+\sigma_z^{(2)}+\sigma_z^{(3)}+\sigma_z^{(4)}-2\sigma_z^{(p)}-1)^2$, which includes only pairwise interactions of the form $\sigma_z^{(k)}\sigma_z^{(m)}$ and single-body $\sigma_z^{(1)}$ terms corresponding to imposed energy differences between the |0> and |1> quantum basis states. Here, $\sigma_z^{(p)}$ represents the ancilla qubit. The short-range Hamiltonian is a sum of the summand Hamiltonians $H_{sr,p}$. For embodiments involving ancillary qubits, a single-body Hamiltonian of the form $h\Sigma_p\sigma_x^{(p)}$ for the plurality of ancillary qubits is added to the initial Hamiltonian.

Alternatively, a plaquette Hamiltonian can be realized without ancillary qubits, e.g., using three-island superconducting devices as transmon qubits. By integrating two additional superconducting quantum interference devices in the coupling unit and by coupling the four qubits of a plaquette capacitively to a coplanar resonator, a summand Hamiltonian of the form $-C\sigma_z^{(1)}\sigma_z^{(2)}\sigma_z^{(3)}\sigma_z^{(4)}$ can be realized. The coupling coefficient C can be tuned by time-dependent magnetic flux biases through the two additional superconducting quantum interference devices.

For a quantum system realized with trapped ions, interactions between two ions are transmitted via a phonon bus. For this, lasers or microwaves are used that are detuned with respect to the blue- and/or red-side band transition of the phonons. The strength of the laser and detuning allow one to adjust the interaction strength. Direct interactions through Rydberg excitations can also be used.

For a quantum system realized with cold atoms, interactions between qubits can be controlled by detuning of a laser that laser excites d atoms. In this case, the Hamiltonian is a d-body Hamiltonian. Plaquette Hamiltonians may either be implemented from d-body interactions or from ancillary qubits with two-body interactions.

For a quantum system realized with quantum dots, an interaction between two qubits is regulated by an electric field gradient and a magnetic field. A short range Hamiltonian can be realized with pulse sequences and magnetic fields. A plaquette Hamiltonian may be realized by using an additional ancillary qubit with the short range Hamiltonian acting on all pairs of the plaquette.

For a quantum system realized with NV centers, interactions between NV centers can be transmitted by coupling them to light fields.

Embodiments described herein involve the notion of a d-body Hamiltonian. A d-body Hamiltonian may be understood as a Hamiltonian representing interactions of the plurality of qubits, wherein no joint interactions occur between groups comprising d+1 or more qubits. A d-body Hamiltonian may involve interactions between groups comprising d or less qubits. A d-body Hamiltonian may be the sum of a plurality of summand Hamiltonians, wherein each summand Hamiltonian represents a joint interaction between a group of d qubits or less.

It is advantageous to have a Hamiltonian which is a d-body Hamiltonian with small d, e.g. d=4, since the corresponding interactions between the qubits can be engineered more easily compared to d-body Hamiltonians with larger d.

For example, a single-body Hamiltonian, as described herein, may be considered as a d-body Hamiltonian with d=1. As a further example, a pairwise nearest-neighbor Hamiltonian, as described herein, may be regarded as a d-body Hamiltonian with d=2. As a yet further example, a plaquette Hamiltonian, as described herein, may be regarded as a d-body Hamiltonian with d=4.

A short-range Hamiltonian as described herein, such as e.g. the first short-range Hamiltonian and/or the second short-range Hamiltonian, may be a d-body Hamiltonian, wherein d may be 2, 3, 4, 5, 6, 7 or 8. At least one of the first short-range Hamiltonian and the second short-range Hamiltonian may be a d-body Hamiltonian, wherein d=4. The value of d may depend on the geometry of the lattice. For instance, for a hexagonal lattice, a plaquette would involve six qubits, and a plaquette Hamiltonian could be a 6-body Hamiltonian.

The initial Hamiltonian, as described herein, may be a d-body Hamiltonian with d being 1, 2, 3 or 4.

At least one of the first short-range Hamiltonian and the second short-range Hamiltonian may be a d-body Hamiltonian, wherein d may be independent of the computational problem. The interaction cut-off distance of the second short-range Hamiltonian may be independent of the computational problem. At least one of the first short-range Hamiltonian and the second short-range Hamiltonian may be independent of the computational problem.

When the parameter d of the first short-range Hamiltonian and the second short-range Hamiltonian is independent of the computational problem, this means that the computation can be realized with the same quantum processing device irrespective of which computational problem is encoded. If a short-range Hamiltonian is independent of the computational problem, the additional advantage is provided that the interactions between the qubits determined by the short-range Hamiltonian need not be changed for different computational problems.

As described herein, the computational problem may have a size. The final Hamiltonian is be the sum of the problem Hamiltonian and the second short-range Hamiltonian. For a further computational problem, the corresponding final Hamiltonian may be the sum of a further problem Hamiltonian and a further second short-range Hamiltonian. If the size of the computational problem is the same as the size of the further computational problem, the further second short-range Hamiltonian may be the same as the second short-range Hamiltonian. If the size of the computational problem is different from the size of the further computational problem, the second short range Hamiltonian may be different from the further second short-range Hamiltonian. For example, with reference to the Ising spin model described above, the computational problem may refer to a first Ising spin model problem for N spins with a first set of coupling coefficients and field coefficients, and the further computational problem may refer to a second Ising spin model problem, also for N spins, with a second set of coupling coefficients and field coefficients different from the first set of coupling coefficients and field coefficients. Therein, the sizes of the first and second Ising spin model problem may both be considered to be equal to the number N. According to embodiments, the second short-range Hamiltonian for the first Ising spin model problem is the same as the second short-range Hamiltonian for the second Ising spin model problem.

Embodiments described herein involve the notion of an intermediate Hamiltonian. The intermediate Hamiltonian is a linear combination of the initial Hamiltonian, the final Hamiltonian and the first short-range Hamiltonian. The coefficient of the first short-range Hamiltonian in the linear combination (e.g. coefficient "c" shown in FIG. 3) may be non-zero. Additionally or alternatively, the coefficient of the initial Hamiltonian in the linear combination (e.g. coefficient "a" shown in FIG. 3) may be non-zero. Additionally or alternatively, the coefficient of the final Hamiltonian in the linear combination (e.g. coefficient "b" shown in FIG. 3) may be non-zero.

The initial Hamiltonian, the final Hamiltonian and the first short-range Hamiltonian may be linearly independent operators. In particular, the first short-range Hamiltonian may not be expressible as a linear combination of the initial Hamiltonian and the final Hamiltonian.

The first short-range Hamiltonian can have the form $H^{SR1}=\sigma_j X_j$, wherein each summand $X_j$ is a Hamiltonian acting on a respective group of qubits or a respective single qubit. Each summand Hamiltonian $X_j$ represents an interaction between a corresponding group of qubits or, in case $X_j$ is a Hamiltonian acting on a single qubit, an interaction between the respective single qubit and an external entity (e.g. a magnetic field). Likewise, the initial Hamiltonian and the final Hamiltonian can each be written as a sum of summand Hamiltonians, wherein each summand Hamiltonian represents an interaction between a group of qubits or between a single qubit and an external entity. According to embodiments described herein, the first short-range Hamiltonian may include one or more summand Hamiltonians $X_j$ which are present in neither the initial Hamiltonian nor the final Hamiltonian. The first short-range Hamiltonian may include a first summand Hamiltonian, wherein neither the initial Hamiltonian nor the final Hamiltonian has a summand Hamiltonian which is equal to, or proportional to, the first summand Hamiltonian of the first-short-range Hamiltonian. The first short-range Hamiltonian can represent one or more interactions, either between a group of qubits or between a single qubit and an external entity, which are present in neither the initial Hamiltonian nor the final Hamiltonian.

For example, as described herein, the initial Hamiltonian can have the form $h\Sigma_k \sigma_x^{(k)}$ and the final Hamiltonian can have the form $\Sigma_k J_k \sigma_z^{(k)} + \Sigma_l C_l$, wherein each $C_l$ is a product of four operators $\sigma_z^{(k)}$ corresponding to a respective plaquette of a two-dimensional lattice. In particular, the only summand Hamiltonians present in the initial Hamiltonian and the final Hamiltonian are summand Hamiltonians of the form $\sigma_x^{(k)}$, of the form $\sigma_z^{(k)}$ or of the form $C_l$ (disregarding the coefficients h and $J_k$ of the Hamiltonians $\sigma_x^{(k)}$ and $\sigma_z^{(k)}$, respectively). In such case, the first short-range Hamiltonian can, for example, be $H^{SR1} = \sigma_k b_k \sigma_y^{(k)}$. Accordingly, none of the summand Hamiltonians $\sigma_y^{(k)}$ of the second short-range Hamiltonian is present as (or proportional to) a summand Hamiltonian of the initial Hamiltonian or the final Hamiltonian. In another example, the first short-range Hamiltonian can have the form $H^{SR1} = \Sigma_j b_j Y_j$, wherein each $Y_j$ is a plaquette operator including a product of four Pauli operators $\sigma_y^{(k)}$, and each $b_j$ is a coefficient. Also in this case, none of the summand Hamiltonians $Y_j$ of the second short-range Hamiltonian is present as (or proportional to) a summand Hamiltonian of the initial Hamiltonian or the final Hamiltonian.

The first short-range Hamiltonian, as described herein, may be a single-body Hamiltonian. The first short-range Hamiltonian may be a single-body Hamiltonian which does not commute with the problem Hamiltonian and/or which does not commute with the initial Hamiltonian. The first short-range Hamiltonian may have the form $\Sigma_k b_k \sigma_y^{(k)}$, wherein each $\sigma_y^{(k)}$ is a Pauli operator acting on qubit k only and wherein each $b_k$ is a coefficient. The Pauli operator $\sigma_y^{(k)}$ does not commute, particularly anti-commutes, with each of the Pauli operators $\sigma_z^{(k)}$ and $\sigma_x^{(k)}$. The Pauli operator $\sigma_y^{(k)}$ may be a Pauli operator corresponding to a third spatial direction ("y-direction"). The third spatial direction may be orthogonal to the first spatial direction and to the second spatial direction as described herein.

A first short-range Hamiltonian of the form $\Sigma_k b_k \sigma_y^{(k)}$ provides the advantage that $\sigma_y^{(k)}$ anti-commutes with both the $\sigma_z^{(k)}$ and $\sigma_x^{(k)}$ terms of the initial Hamiltonian and the final Hamiltonian, respectively. Accordingly, the first short-range Hamiltonian adds a new degree of freedom. A larger space of possible "paths" for evolving the initial into the final Hamiltonian becomes available.

In atomic systems and ion traps, a short-range Hamiltonian of the form $\sigma_k b_k \sigma_y^{(k)}$ can be realized, for example, by providing time-dependent laser pulses. In superconducting qubits, such as e.g. flux qubits or transmon qubits, such a short-range Hamiltonian can be realized experimentally with microwave driving.

The method according to embodiments described herein may include initializing the quantum system in an initial quantum state by cooling the quantum system towards a ground state of the initial Hamiltonian. The cooling may be performed by a cooling unit as described herein. The ground state of the initial Hamiltonian is a quantum state of the quantum system minimizing the energy for the initial Hamiltonian. The ground state of the initial Hamiltonian is an eigenstate of the initial Hamiltonian, in particular an eigenstate with minimal eigenvalue. The ground state of the initial Hamiltonian is a state of the quantum system at zero temperature. Cooling the quantum system towards the ground state of the initial Hamiltonian may allow for approaching the ground state of the initial Hamiltonian. The initial quantum state may approximate the ground state of the initial Hamiltonian.

The initial Hamiltonian may be independent of the computational problem.

The method described herein includes evolving the initial Hamiltonian into the final Hamiltonian via the intermediate Hamiltonian, which may be performed after initializing the quantum system in the initial quantum state. Evolving the initial Hamiltonian into the final Hamiltonian via the intermediate Hamiltonian may be performed by a Hamiltonian evolution unit as described herein.

The initial Hamiltonian may be evolved into the final Hamiltonian via the intermediate Hamiltonian according to an interpolation Hamiltonian.

An interpolation Hamiltonian may be a time-dependent Hamiltonian. At the initial time, the interpolation Hamiltonian may be equal to the initial Hamiltonian. At the intermediate time, the interpolation Hamiltonian may be equal to the intermediate Hamiltonian. At the final time, the interpolation Hamiltonian may be equal to the final Hamiltonian.

An interpolation Hamiltonian may provide a gradual or continuous evolution from the initial Hamiltonian to the final Hamiltonian. The gradual or continuous evolution may include gradually changing an adjustable parameter, e.g. a time parameter t as described herein, of the interpolation Hamiltonian from an initial parameter value of the adjustable parameter to a final value of the adjustable parameter.

An interpolation Hamiltonian may be such that, for each value of the time parameter t of the interpolation Hamiltonian between the initial time and the final time, the interpolation Hamiltonian is a short-range Hamiltonian, particularly a d-body Hamiltonian, more particularly a single-body Hamiltonian.

For example, an interpolation Hamiltonian can have the form $H(t)=A(t)H^{init}+B(t)H^{fin}+H^{SR}(t)$, wherein $A(t)$ and $B(t)$ are interpolation coefficients and wherein $H^{SR}(t)$ is a time-dependent short-range Hamiltonian, particularly a time-dependent d-body Hamiltonian, more particularly a time-dependent single-body Hamiltonian. For example, $H^{SR}(t)$ can be a time-dependent single-body Hamiltonian having the form $H^{SR}(t)=\Sigma_k H_k(t)$, wherein each summand $H_k(t)$ is a time-dependent Hamiltonian acting on qubit k only.

The initial Hamiltonian may be evolved into the final Hamiltonian via the intermediate Hamiltonian to evolve the quantum system towards a ground state of the final Hamiltonian. A ground state of the final Hamiltonian is a quantum state of the quantum system minimizing the energy for the final Hamiltonian. A ground state of the final Hamiltonian is an eigenstate of the final Hamiltonian, in particular an eigenstate with minimal eigenvalue. Since the computational problem is encoded in the problem Hamiltonian and since the final Hamiltonian is the sum of the problem Hamiltonian and the second short-range Hamiltonian, a ground state of the final Hamiltonian contains information about the computational problem and/or may encode a solution of the computational problem.

A ground state of the final Hamiltonian may be a state of the quantum system at zero temperature. Not wishing to be bound by any particular theory, according to considerations in the field of quantum physics, it is considered impossible for a quantum system to reach a temperature of absolute zero. Still, evolving the quantum system towards the ground state of the final Hamiltonian, including e.g. cooling the quantum system to an operating temperature $T_{max}$, may allow approaching the ground state of the final Hamiltonian. The operating temperature $T_{max}$ may depend strongly on the type of qubits used in the quantum system. E.g. for superconducting qubits, $T_{max}$ may be 50 mK or below, preferably 1 mK or below. The initial Hamiltonian may be evolved into the final Hamiltonian via the intermediate Hamiltonian to approach a ground state of the final Hamiltonian. After having evolved the initial Hamiltonian into the final Hamiltonian via the intermediate Hamiltonian, the quantum system may be in a final quantum state. The final quantum state may be a state of the quantum system at the operating temperature $T_{max}$ or at a lower temperature, i.e. it may be a thermal state of the final Hamiltonian at the operating temperature or at a lower temperature. Accordingly, the final quantum state may approximate the ground state of the final Hamiltonian. The final quantum state may contain information about the ground state of the final Hamiltonian. The final quantum state may contain information about the solution to the computational problem.

The quantum system may be a cooled, e.g. by a cooling unit as described herein, to the operating temperature $T_{max}$ or to a lower temperature. The operating temperature may be a non-zero temperature. The quantum system can be maintained at a temperature of 50 mK or below, in particular 1 mK or below while the initial Hamiltonian is evolved into the final Hamiltonian via the intermediate Hamiltonian.

The initial Hamiltonian may be evolved into the final Hamiltonian via the intermediate Hamiltonian by a diabatic quantum process.

The term "diabatic quantum process" is used herein to distinguish over adiabatic quantum processes or evolutions. A diabatic quantum process can be understood as a quantum process which is not adiabatic. It is understood that no real-life physical process is adiabatic in an exact, theoretical sense, since the theoretical notion "adiabatic" refers to an idealized situation of an infinitely slow process. That is, when adopting the theoretical definition of the term "adiabatic", every physical process can be regarded as a non-adiabatic, or diabatic, process. However, within the context of the present disclosure, the terms "adiabatic" and "diabatic" shall be understood, not in a theoretical sense, but in an experimentally realistic, technical sense, namely to distinguish between quantum evolutions which are performed at a speed respecting the speed limit imposed by the adiabatic theorem and quantum evolutions which are performed faster than such speed limit.

An adiabatic process, or evolution, from a first Hamiltonian of a quantum system to a second Hamiltonian of the quantum system can be understood as an evolution which proceeds at a speed lying below the speed limit imposed by the adiabatic theorem of quantum mechanics to ensure that the state of the quantum system is well-approximated by the instantaneous ground state of the quantum system at all times of the evolution. An adiabatic evolution can be an evolution of the quantum system according to a time-dependent Hamiltonian, wherein the rate of change of the time-dependent Hamiltonian is much smaller than the energy gap between the ground state and the first excited state of the time-dependent Hamiltonian at all times of the evolution. Without wishing to be bound by any particular theory, according to the theory of quantum mechanics the probability for a quantum system to be in a ground state of a time-dependent Hamiltonian is provided, at least in an approximate sense, by the Landau-Zener formula. According to this formula, the probability of a transition from a ground state to an excited state of the Hamiltonian increases exponentially with the speed of the time evolution and decreases exponentially with the energy gap between the ground state and the first excited state. Adiabatic evolutions can arise in approaches for performing quantum computation, such as e.g. quantum annealing.

A diabatic quantum process or evolution from a first Hamiltonian to a second Hamiltonian can be understood as an evolution which proceeds at a speed lying above the speed limit imposed by the adiabatic theorem of quantum mechanics, e.g. by at least 10%. A diabatic evolution can be an evolution of the quantum system according to a time-dependent Hamiltonian, wherein the rate of change of the time-dependent Hamiltonian is approximately equal to or larger than the energy gap between the ground state and the first excited state of the time-dependent Hamiltonian at all times of the evolution. A diabatic quantum process or evolution can be understood as a process wherein a probability for a transition from a ground state to an exited state is 5% or higher, particularly 10% or higher. Even if such an transition happened, e.g. when evolving the initial Hamiltonian 460 diabatically into the final Hamiltonian 480 via the intermediate Hamiltonian 470, the ground state of the final Hamiltonian 480 can still be reached due to a transition back into the instantaneous ground state.

In some implementations, a diabatic quantum process or evolution can be a counter-diabatic quantum process or evolution. A counter-diabatic process can be understood as a diabatic process wherein an initial Hamiltonian is evolved into a final Hamiltonian according to an interpolation Hamiltonian, wherein the interpolation Hamiltonian is a linear combination of the initial Hamiltonian, the final Hamiltonian and an additional Hamiltonian. The additional Hamiltonian, also called "counter-diabatic Hamiltonian", can be selected such that the probability of finding the quantum system in a ground state of the final Hamiltonian (the "ground-state probability") at the end of the process is large as compared to a process wherein the additional Hamiltonian is not included. By virtue of the counter-diabatic Hamiltonian, a counter-diabatic process can reach the ground state of the final Hamiltonian faster than an adiabatic process, i.e. the ground state of the final Hamiltonian can be reached by evolving at a speed which lies above the speed limit imposed by the adiabatic theorem. The inventors have found that the intermediate Hamiltonian as described herein, e.g. a single-body Hamiltonian of the form of the form $\Sigma_k b_k \sigma_y^{(k)}$, provides a suitable choice, at least in an approximate sense, for realizing a counter-diabatic Hamiltonian.

The initial Hamiltonian may be diabatically evolved into the intermediate Hamiltonian. The intermediate Hamiltonian may be diabatically evolved into the final Hamiltonian. The initial Hamiltonian may be evolved into the final Hamiltonian via the intermediate Hamiltonian according to an interpolation Hamiltonian. The evolution determined by the interpolation Hamiltonian may be a diabatic evolution.

The method according to embodiments described herein includes measuring at least a portion of the plurality of qubits to obtain a read-out of the quantum system. According to some embodiments, a portion of the plurality of qubits is measured, so that not all qubits in the plurality of qubits are measured. The portion of the plurality of qubits may comprise 70% or less of the plurality of qubits, in particular 60% or less, more particularly 50% or less. According to some embodiments, if the total number of qubits in the plurality of qubits is denoted by N, then the number of qubits in the portion scales according to $\sqrt{N}$.

Measuring the at least a portion of the plurality of qubits may include measuring each qubit in the at least a portion individually. Measuring the at least a portion may include measuring a Pauli operator, e.g. the Pauli operator $\sigma_z$, for each of the qubits in the at least a portion of the qubits. Measuring the at least a portion may include performing a two-outcome measurement for each qubit in the at least a portion of the plurality of qubits. A two-outcome measurement may provide one of two possible outcomes, e.g. 0 or 1. The at least a portion of qubits may be measured by a measurement device as described herein.

Measuring the at least a portion may provide the readout of the quantum system. The read-out may have the form of classical information, represented by a plurality of classical bits. The read-out may reveal information about the ground state of the final Hamiltonian. The read-out may provide information about a solution, e.g. a trial solution, a true solution or a set of witness variables, to the computational problem. The read-out may be a solution to the computational problem.

The at least a portion of the plurality of qubits can be measured to obtain a read-out of the quantum system on or after the final time.

For a quantum system including a plurality of N superconducting qubits, the qubit states |0> and |1> for the plurality of qubits can be measured with high fidelity using a measurement device including a plurality of superconducting quantum interference devices, in particular N hysteretic DC superconducting quantum interference devices and N RF superconducting quantum interference device latches controlled by bias lines, wherein the number of bias lines scales according to $\sqrt{N}$.

For a quantum system realized with trapped ions, a measurement of the quantum system can be performed by fluorescence spectroscopy. Therein, ions are driven on a transition with short lifetime if they are in one of the two spin states. As a result, the ions in the driven state emit many photons, while the other ions remain dark. The emitted photons can be registered by commercial CCD cameras. Measurement in any of the directions on the Bloch sphere is achieved by appropriate single-qubit pulses prior to the fluorescence spectroscopy.

For a quantum system realized with cold atoms, the qubits can be measured by performing a selective sweep of ground state atoms and fluorescence imaging with single site resolutions.

For a quantum system realized with quantum dots, the qubits can be read out from a pulse sequence by rapid adiabatic passage.

The method according to embodiments described herein includes determining a solution to the computational problem from the read-out. The read-out may be provided to a classical computing system, as described herein. The classical computing system may determine or compute the solution to the computational problem from the read-out.

Computing a solution to the computational problem may include computing a trial solution to the computational problem. A trial solution may or may not be a true solution to the computational problem. For embodiments according to which the computational problem belongs to the complexity class NP, computing a solution to the computational problem may include computing a set of witness variables, as described herein.

For a computational problem belonging to the complexity class NP, e.g. an NP-complete problem, the read-out of the measurement may include a set of witness variables of the computational problem.

The initial Hamiltonian may be evolved into the final Hamiltonian via the intermediate Hamiltonian according to a first time-dependent interpolation Hamiltonian $H_1(t)$, wherein t is a time variable. The obtained read-out of the quantum system may be a first read-out. The determined solution to the computational problem may be a first solution. The method according to embodiments described herein may further include evolving (e.g. by a Hamiltonian evolution unit as described herein) the initial Hamiltonian into the final Hamiltonian according to a second time-dependent interpolation Hamiltonian $H_2(t)$.

Evolving the initial Hamiltonian into the final Hamiltonian according to the second time-dependent interpolation Hamiltonian $H_2(t)$ may be followed by: measuring (e.g. by a measurement device as described herein) at least a portion of the plurality of qubits to obtain a second read-out of the quantum system; determining (e.g. by a classical computing system as described herein) a second solution to the computational problem from the second read-out; comparing (e.g. by a classical computing system as described herein) the first solution with the second solution; and, based on the comparing, selecting a third time-dependent interpolation Hamiltonian $H_3(t)$ for evolving the quantum system into the final Hamiltonian.

The notions "interpolation Hamiltonian" and "time-dependent interpolation Hamiltonian" are used synonymously herein.

The second time-dependent interpolation Hamiltonian $H_2(t)$ is different from the first time-dependent interpolation Hamiltonian $H_1(t)$.

Evolving the initial Hamiltonian into the final Hamiltonian according to the second time-dependent interpolation Hamiltonian may include evolving the initial Hamiltonian into the final Hamiltonian via a further intermediate Hamiltonian. The further intermediate Hamiltonian may be a linear combination of the initial Hamiltonian, the final Hamiltonian and a further short-range Hamiltonian, e.g. a further single-body Hamiltonian. The initial Hamiltonian, the final Hamiltonian and the further short-range Hamiltonian may be linearly independent operators.

The first time-dependent interpolation Hamiltonian NO may have one or more adjustable parameters. The second time-dependent interpolation Hamiltonian $H_2(t)$ may be obtained from the first time-dependent interpolation Hamiltonian $H_1(t)$ by adjusting the one or more adjustable parameters. The third time-dependent interpolation Hamiltonian $H_3(t)$ may be obtained from the first time-dependent interpolation Hamiltonian NO or from the second time-dependent interpolation Hamiltonian $H_2(t)$ by adjusting the one or more adjustable parameters. The first, second and third time-dependent interpolation Hamiltonians may belong to a same family of time-dependent Hamiltonians which are related to each other by a change of one or more parameters. For example, a Hamiltonian family $H_\alpha(t)$ may be provided, wherein $\alpha$ is an adjustable parameter. For a first value of the parameter $\alpha$, the Hamiltonian $H_\alpha(t)$ can be equal to the first time-dependent interpolation Hamiltonian. For a second value of the parameter $\alpha$, the Hamiltonian $H_\alpha(t)$ can be equal to the second time-dependent interpolation Hamiltonian. For a third value of the parameter $\alpha$, the Hamiltonian $H_\alpha(t)$ can be equal to the third time-dependent interpolation Hamiltonian.

Comparing the first solution of the computational problem with the second solution of the computational problem may include determining which of the first solution and the second solution is a better approximation of a true solution of the computational problem. For example, if the computational problem is an Ising spin model problem, the first solution and the second solution may be provided in the form of a first configuration of spins and a second configuration of spins, respectively, both of which may be candidate solutions for the ground state of the Ising spin model. Comparing the first solution with the second solution may include determining the energy of the first configuration of spins, determining the energy of the second configuration of spins and comparing the energy of the first configuration of spins with the energy of the second configuration of spins. For example, if the energy of the second configuration of spins is lower than the energy of the first configuration of spins, it can be considered that the second configuration of spins is a better approximation of the ground state of the Ising spin model than the first configuration of spins.

Based on the comparison of the first solution with the second solution, the third time-dependent interpolation Hamiltonian may be selected. For example, if it is determined that the second solution is a better approximation of a true solution of the computational problem than the first solution, the third time-dependent interpolation Hamiltonian may be selected in a manner such that the third time-dependent interpolation Hamiltonian lies in the vicinity of the second time-dependent interpolation Hamiltonian. For example, in the example involving the Hamiltonian family $H_\alpha(t)$ as discussed above, the third value of the parameter $\alpha$ can be chosen to be close to the second value of the parameter $\alpha$.

The method according to embodiments described herein may include evolving (e.g. by a Hamiltonian evolution unit as described herein) the initial Hamiltonian into the final Hamiltonian according to the third time-dependent interpolation Hamiltonian $H_3(t)$.

The process of selecting a new interpolation Hamiltonian based on the comparison of solutions of the computational problem resulting from earlier interpolation Hamiltonians and implementing the selected interpolation Hamiltonian can be continued iteratively. Accordingly, an iterative method for computing solutions to the computational problem is provided, wherein the method includes an optimization over the adjustable parameter(s) of the time-dependent interpolation Hamiltonians considered. For example, the method can include an optimization over the parameter $\alpha$ of the Hamiltonian family $H_\alpha(t)$. As compared to approaches which only involve a single fixed interpolation Hamiltonian, embodiments described herein thereby provide the advantage that they allow finding a better approximation of a true solution of the computational problem, or even finding the true solution itself.

A further aspect of embodiments described herein is that an inhomogeneous switching-off (or "inhomogeneous driving") of the initial Hamiltonian can be provided, as described in the following.

As described herein, the initial Hamiltonian can be a single-body Hamiltonian having the form $H^{init} = \Sigma_k H^{(k)}$, wherein each term $H^{(k)}$ is a Hamiltonian acting on qubit k only. The method according to embodiments described herein can include selecting one of the qubits, say qubit k1, e.g. by random selection. An intermediate Hamiltonian can be considered which is, for example, equal to $$H^{int}=H^{init}+bH^{fin}-H^{(k1)}.$$

wherein b is a coefficient. The intermediate Hamiltonian $H^{int}$ is thereby a linear combination of the initial Hamiltonian $H^{init}$, the final Hamiltonian $H^{fin}$ and a first short-range Hamiltonian (the short-range Hamiltonian being equal to $-H^{(k1)}$). The initial Hamiltonian is evolved into the intermediate Hamiltonian so that, at the intermediate time $t_{int}$, the Hamiltonian is $H^{int}$. For example, the initial Hamiltonian can be gradually evolved into the intermediate Hamiltonian according to an interpolation Hamiltonian as described herein. The intermediate Hamiltonian $H^{int}$ shown above is equal to $\Sigma_{k \neq k1} H^{(k)} + b\,H^{fin}$, wherein the sum runs over all qubits k which are different from k1. Accordingly, the Hamiltonian $H^{(k1)}$ acting on qubit k1 is no longer present in the intermediate Hamiltonian, whereas all other Hamiltonians $H^{(k)}$ are still present. In other words, at the intermediate time $t_{int}$, the Hamiltonian $H^{(k1)}$ acting on qubit k1 has been selectively switched off.

Continuing in this way, it is possible to individually switch off, one by one, all summand Hamiltonians $H^{(k)}$ of the initial Hamiltonian. For achieving this, the intermediate Hamiltonian can be evolved into the final Hamiltonian via several further intermediate Hamiltonians, wherein in the further intermediate Hamiltonians an increasingly larger set of summand Hamiltonians $H^{(k)}$ are switched off.

The initial Hamiltonian may be a single-body Hamiltonian of the form $\Sigma_k H^{(k)}$, wherein each summand Hamiltonian $H^{(k)}$ acts on qubit k only. Evolving the initial Hamiltonian into the final Hamiltonian via the intermediate Hamiltonian can include individually switching off a first summand Hamiltonian $H^{(k1)}$ of the initial Hamiltonian. The first summand Hamiltonian can be switched off gradually.

Evolving the initial Hamiltonian into the final Hamiltonian via the intermediate Hamiltonian can include inhomogeneously switching off the initial Hamiltonian. The inhomogeneous switching-off of the initial Hamiltonian can include: selecting a first qubit of the plurality of qubits; gradually switching off the summand Hamiltonian of the initial Hamiltonian acting on the first qubit; selecting a second qubit of the plurality of qubits, wherein the second qubit is different from the first qubit; and gradually switching off the summand Hamiltonian of the initial Hamiltonian acting on the second qubit. The first qubit and/or the second qubit can be selected randomly. The summand Hamiltonian of the initial Hamiltonian acting on the first qubit can be switched off individually. The summand Hamiltonian of the initial Hamiltonian acting on the second qubit can be switched off individually.

The inhomogeneous switching-off of the initial Hamiltonian can include: randomly selecting individual qubits of the plurality of qubits until all qubits of the plurality of qubits have been selected; and, for each selected qubit, gradually switching off the summand Hamiltonian of the initial Hamiltonian acting on the selected qubit, wherein the summand Hamiltonian can be switched off individually.

Approaches to quantum computing which do not involve the intermediate Hamiltonian as described herein may not allow for an individual switching-off of the summand Hamiltonians of the initial Hamiltonian. In particular, when performing an interpolation of the form $H(t)=(1-t)H^{init}+tH^{fin}$, an individual switching off of the summand Hamiltonians cannot be achieved.

An advantage of individually switching of the summand Hamiltonians of the initial Hamiltonian is that thereby a first-order phase transition can be avoided. This results in a larger minimal energy gap during the evolution from the initial Hamiltonian to the final Hamiltonian, as compared to switching off all summand Hamiltonians of the initial Hamiltonian simultaneously. Due to the larger energy gap, the speed limit imposed by the adiabatic theorem of quantum mechanics is increased. Accordingly, an evolution (particularly an adiabatic evolution) from the initial Hamiltonian to the final Hamiltonian can be performed faster while still remaining in (or close to) a ground state of the quantum system at all times from the initial time to the final time. Accordingly, the ground state of the final Hamiltonian can be reached faster, so that a solution of the computational problem can be determined faster as well.

According to a further embodiment, an apparatus for computing solutions to computational problems, such as e.g. apparatus 400 shown in FIG. 1, is provided. The apparatus includes a quantum system comprising a plurality of qubits. The apparatus includes a cooling unit, such as e.g. cooling unit 410 shown in FIG. 1, adapted for cooling the quantum system towards a ground state of the quantum system. The apparatus includes a Hamiltonian evolution unit, such as e.g. Hamiltonian evolution unit 430 shown in FIG. 1, adapted for evolving an initial Hamiltonian of the quantum system into a final Hamiltonian of the quantum system via an intermediate Hamiltonian of the quantum system. The intermediate Hamiltonian is a linear combination of the initial Hamiltonian, the final Hamiltonian and a first short-range Hamiltonian. The final Hamiltonian is a sum of a problem Hamiltonian and a second short-range Hamiltonian, wherein the problem Hamiltonian is a single-body Hamiltonian comprising a plurality of adjustable parameters. The apparatus includes a measurement device, such as e.g. measurement device 440 shown in FIG. 1, adapted for measuring at least a portion of the plurality of qubits. The apparatus includes a classical computing system, such as e.g. classical computing system 450 shown in FIG. 1, connected to the Hamiltonian evolution unit and to the measurement device.

The cooling unit may be configured for cooling the quantum system towards a ground state of the initial Hamiltonian, as described herein. The cooling unit may be configured for maintaining the quantum system at an operating temperature. The appropriate operating temperature strongly depends on the type of qubits used in the apparatus. E.g., for superconducting qubits, the operating temperature is 50 mK or below, in particular 1 mK or below. The cooling unit may be configured for maintaining the quantum system at the operating temperature while the initial Hamiltonian is evolved into the final Hamiltonian via the intermediate Hamiltonian.

The classical computing system may be configured for receiving, as an input, a computational problem as described herein. The classical computing system may be configured for encoding the computational problem into the problem Hamiltonian. The encoding comprises determining, from the computational problem, a problem-encoding configuration for the plurality of adjustable parameters of the problem Hamiltonian. The classical computing system may be configured for communicating the problem-encoding configuration to the Hamiltonian evolution unit.

The Hamiltonian evolution unit may be configured for receiving the problem-encoding configuration from the classical computing system. The Hamiltonian evolution unit may be configured for evolving the initial Hamiltonian into the final Hamiltonian via the intermediate Hamiltonian, wherein, in the final Hamiltonian, the plurality of adjustable parameters of the problem Hamiltonian are in the problem-encoding configuration;

The classical computing system may be configured for receiving a read-out of the quantum system from the measurement device. The classical computing system may be configured for determining a solution to the computational problem from the read-out.

Further aspects of the present disclosure are described with respect to FIGS. 10-17. A specific encoding of a computational problem into a problem Hamiltonian and the corresponding final Hamiltonian are described, namely an encoding of an Ising spin model problem with possibly long-range interactions into a final quantum Hamiltonian being the sum of a single-body problem Hamiltonian and a plaquette Hamiltonian. The (classical) Ising spin model problem with long-range interactions is NP-complete, and its quantization is trivial so that no distinction between the classical and quantum Ising spin model will be made herein. Mappings of other classical computational problems to the Ising spin model problem are known. The ground state of the final quantum Hamiltonian, or a thermal state at low operating temperature, can therefore contain information about a solution of the Ising spin model problem, and, by inverse mapping, of many classical NP-hard computational problems. The specific mapping to the final quantum Hamiltonian allows a realization of a quantum processing device (quantum processor) in a 2 dimensional surface, specifically a 2-dimensional lattice, if the Ising spin model problem includes only d-body interactions with d smaller or equal to two, and allows a realization of the quantum processing device in a 3-dimensional space, specifically in a 3-dimensional lattice, if the Ising spin model problem includes only d-body interactions with d smaller or equal to three. The mapping can be extended to Ising spin model problems with d-body interactions and arbitrary d. The quantum processing devices are fully programmable through the single-body problem Hamiltonian, and are scalable architectures.

The case of the Ising spin model problem which includes only d-body interactions with d smaller or equal to two is considered first. The specific encoding starts from the Ising spin model problem for n spins, as described herein, with at most two-body interactions and corresponding coupling coefficients $c_{ij}$. The indices i and j may range from 1 to n with j being smaller than i. In a first case, all field coefficients $c_i$ are equal to zero. FIG. 10 illustrates an Ising spin model problem for n=6 spins, wherein the spins are labeled from 1 to 6. There are n(n−1)/2=15 pairwise interactions between the spins, as indicated in FIG. 10 by the lines connecting pairs of spins. For example, the line indicated with 12 represents a pairwise interaction between the spins 1 and 2. The 15 pairwise interactions correspond to 15 coupling coefficients $c_{ij}$. The interactions are long-range interactions.

For every pair of spins in the Ising spin model, a corresponding qubit in the quantum system is provided. For example, for the 6 spins with 15 pairwise interactions shown in FIG. 10, the corresponding quantum system includes 15 qubits. A configuration of spins in the Ising spin model is mapped to a configuration of the corresponding qubits. Therein, the configuration of the qubits depends on a relative orientation of the spins. A pair of spins pointing in the same direction (parallel alignment) are mapped to a qubit in the quantum basis state "|1>". Further, a pair of spins pointing in opposite directions (antiparallel alignment) are mapped to a qubit in the quantum basis state "|0>". This mapping is illustrated in FIG. 11. In FIG. 11, the labels 0 and 1 correspond to the quantum basis states |0> and |1>, respectively.

The coupling coefficients $c_{ij}$ are mapped to a plurality of adjustable parameters $J_k$ of a problem Hamiltonian encoding the computational problem, in this case the Ising spin model problem. The problem Hamiltonian has the form $\Sigma_k J_k \sigma_z^{(k)}$, wherein k=n*i+j and wherein k ranges from 1 to M with M=n(n−1)/2. The Ising spin model problem is mapped to the problem Hamiltonian in such a way that the adjustable parameters $J_k$ of the problem Hamiltonian represent the interactions between the spins in the Ising spin model, corresponding to the coupling coefficients $c_{ij}$.

The number of qubits needed for encoding the the Ising spin model problem in the problem Hamiltonian increases quadratically compared to the Ising spin model problem for n spins, because the number of two-body interactions between the spins is equal to M=n(n−1)/2. According to some embodiments, additional degrees of freedom may be considered. The total number of qubits in the quantum system may be M+n−2 or more, wherein n−2 additional ancillary qubits and/or additional auxiliary qubits may be added for reasons explained below. Accordingly, the number of qubits may be greater than the number of spins n. In particular, the number of qubits may be the number of spins n plus M−2 additional degrees of freedom. The problem Hamiltonian allows a programming of the quantum processing device with only local interactions, in particular single-body interactions with external fields.

The increased number of degrees of freedom of the quantum system compared to the Ising spin model is compensated by a short-range Hamiltonian (the second short-range Hamiltonian as described herein) which is the sum of M−n 4-body summand Hamiltonians $C_l$, called constraint Hamiltonians representing constraints for fixing a portion of the qubits. The short-range Hamiltonian has the form $\Sigma_l C_l$, wherein the index l ranges from 1 to $(n^2−3n)/2$ and wherein each summand Hamiltonian $C_l$ is a constraint Hamiltonian which may have the form $$C_l = -C\left(\sum_{m=n,e,s,w} \tilde{\sigma}_z^{(l,m)} + S_z^l\right)^2$$
$$= -C\tilde{\sigma}_z^{(l,n)}\tilde{\sigma}_z^{(l,e)}\tilde{\sigma}_z^{(l,s)}\tilde{\sigma}_z^{(l,w)}.$$

In reference to the above equation, two possible implementations of the constraint Hamiltonians may be considered. The sum in the above equation may represent an ancilla-based implementation. The sum runs over the four members of a plaquette (north, east, south, west) of a 2-dimensional lattice according to which the qubits are arranged. Further, each $s_z^l$ is an operator acting on an ancillary qutrit included in the quantum system. An ancillary qutrit has a basis consisting of three basis states which, in this embodiment, will be labeled |0>, |2>, and |4>. The second implementation of the short-range Hamiltonians is an interaction-based implementation that does not require ancillary qutrits. According to the interaction-based implementation, $C_l$ is a four-body interaction between qubits forming a plaquette of the lattice. Further, in the above equation, C represents a constraint strength, e.g. a constant constraint strength.

As described above, the encoding of the Ising spin model in the problem Hamiltonian involves mapping configurations of spins of the Ising spin model onto configurations of qubits in the quantum system, wherein a configuration of qubits depends on the relative orientation of pairs of spins in the corresponding configuration of spins. To provide a consistent mapping, aspects relating to closed loops in the Ising spin model are taken into account, as discussed in the following. In each closed loop of spins in the Ising spin model, the number of pairs of spins having an anti-parallel alignment is an even number. For example, with reference to FIG. 10, consider e.g. the closed loop formed by the connections 14, 24, 23 and 13 as indicated by the dashed lines. The closed loop includes the spins 1, 2, 3 and 4. Any configuration of the spins 1, 2, 3 and 4 includes zero, two or four pairs of anti-parallel spins. No configuration of the spins 1, 2 3 and 4 has one or three pairs of anti-parallel spins. Accordingly, every configuration of the spins 1, 2, 3 and 4 has an even number of anti-parallel spins.

Figure 12:
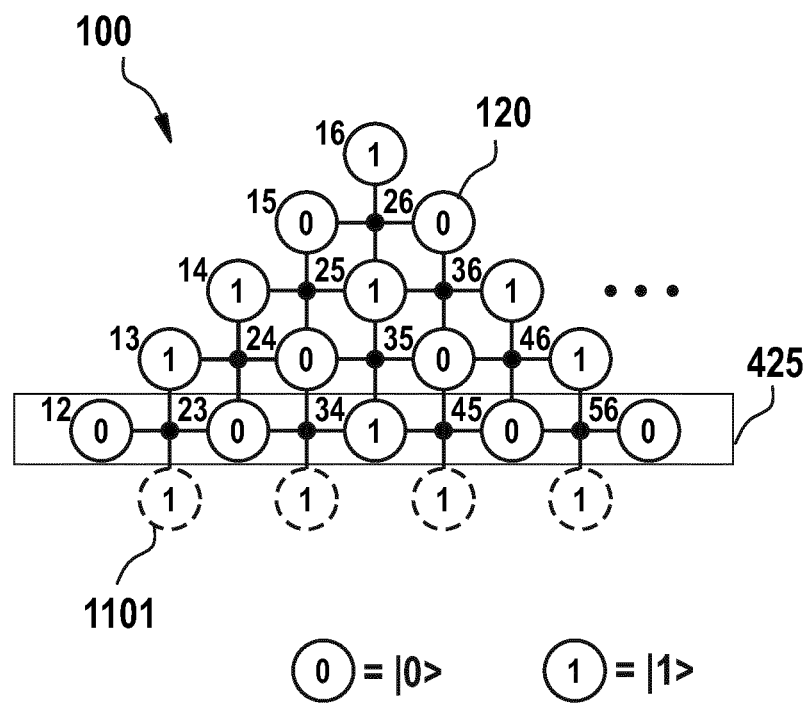
Figure 13:
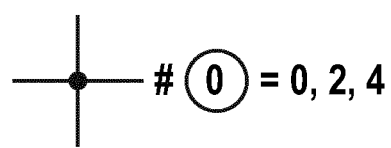
Figures 14, 15, 16:
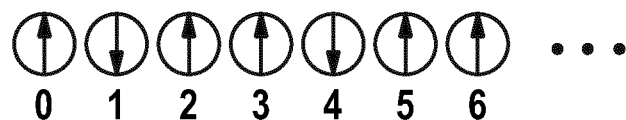
Figure 17:
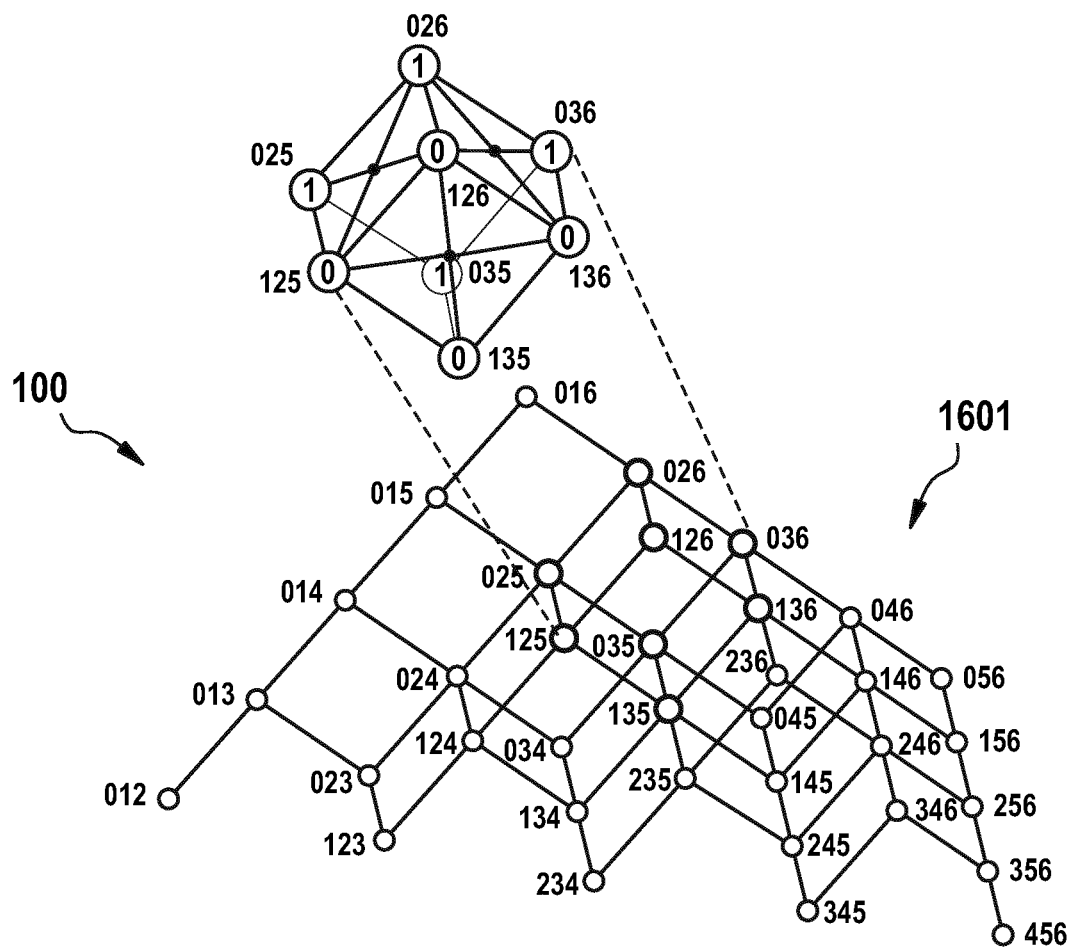

Since pairs of antiparallel spins are mapped to qubits being in the quantum basis state |0>, every set of qubits in the quantum system corresponding to a closed loop of spins in the Ising spin model has an even number of quantum basis states |0>. This provides a set of constraints for at least a portion of the qubits of the quantum system. For example, for the closed loop discussed above with reference to FIG. 10, the corresponding group of four qubits is shown in FIG. 12, indicated with reference numerals 14, 24, 23 and 13 in view of the correspondence between pairs of spins in the Ising model and qubits in the quantum system. A shown in FIG. 12, the qubits 14, 24, 23 and 13 correspond to a plaquette of the 2-dimensional lattice 120. In view of the constraint on the closed loop as described above, any configuration of quantum basis states for the qubits 14, 24, 23 and 13 includes either zero, 2 or four quantum basis states |0>, as illustrated in FIG. 13.

To ensure that the constraints corresponding to all closed loops are satisfied, it is sufficient to enforce constraints associated to a suitable subset of closed loops. According to this embodiment, particular building blocks of closed loops involving groups of at most four spins are sufficient to ensure that that all constraints are satisfied, so that a consistent mapping from the Ising spin model to the quantum system provided. The building blocks include closed loops consisting of four spins connected by four connections, wherein one connection has an index distance s, two connections have index distance s+1 and one connection has index distance s+2. Therein, s ranges from 1 to N−2 and the notion of an "index distance" between spins $s_i$ and $s_j$ refers to the number |i−j|. The set of building block closed loops with s=1 provide n−2 constraints. For example, the closed loop including the connections 14, 24, 23 and 13 between spins 1, 2, 3 and 4, as shown in FIG. 10 and as described above, is a building block closed loop with s=1.

A further aspect relates to the boundary of the quantum system. Some building block closed loops involve a group of three spins connected with three connections, instead of four spins connected with four connections. For example, in reference to FIG. 10, the closed loop including the connections 12, 23 and 13 between the spins 1, 2 and 3 may be considered in this respect. The corresponding group of qubits in the quantum system includes three qubits 12, 23 and 13 arranged according to triangular-shaped plaquette of the 2-dimensional lattice. To enforce the constraint corresponding to the closed loop of three spins, a 3-body constraint Hamiltonian $C_1$ may be considered acting on the corresponding group of three qubits. Alternatively, an additional line of n−2 auxiliary qubits fixed in the quantum basis state |1> may be included in the quantum system, as shown in FIG. 12 by the circles with dashed lines. To enforce a constraint corresponding to a closed loop of three spins, e.g. the closed loop corresponding to the qubits 12, 23 and 13, a constraint Hamiltonian $C_1$ may be considered acting on the corresponding three qubits and on one of the auxiliary qubits, namely the auxiliary qubit 1101 shown in FIG. 12. Accordingly, the constraint Hamiltonian $C_1$ is a 4-body Hamiltonian acting on a plaquette of an enlarged 2-dimensional lattice, having the same form as described above. The latter realization has the advantage that all constraint Hamiltonians can be treated on the same footing, since all constraint Hamiltonians are 4-body Hamiltonians corresponding to plaquettes of a 2-dimensional lattice.

The constraint Hamiltonians $C_1$ ensure that the constraints corresponding to the building block closed loops, and thus the constraints corresponding to all closed loops, are satisfied. Accordingly, the short-range Hamiltonian provides for a consistent mapping from constraints on the spins in the Ising spin model to constraints imposed on the quantum system.

To provide the readout, a portion of the qubits can be measured, such as e.g. the portion 425 shown in FIG. 12. If the quantum system is in the ground state of the final Hamiltonian, the qubits in the portion 425 will be in a configuration of quantum basis states corresponding to a configuration of spins in the ground state of the Ising spin model. If the quantum system is in a thermal state of the final Hamiltonian close to the ground state, i.e. at sufficiently low temperature, this is true with high probability. Accordingly, measuring the portion 425 allows determining a solution to the Ising spin model problem, at least with a high probability. If the quantum system is in the final state, as described herein, wherein the final state is well-approximated by the ground state of the final Hamiltonian, measuring the portion 425 will thus at least provide information about the ground state of the Ising model, from which a trial solution can be computed. It can then be tested by classical computing in polynomial time whether the trial solution is a true solution and, if not, the computation can be repeated until a true solution is found.

As a further advantage of embodiments described herein, since information about the Ising spin model is encoded in a redundant manner in the quantum system, a variety of possible groups of qubits can be measured to provide a readout from which a solution to the computational problem can be determined.

In light of the above, the construction of the second short-range Hamiltonian according to this embodiment is such that (i) the constraints cover all interactions between the spins, (ii) the number of constraints is $(n^2-3n)/2$ and (iii) the second short-range Hamiltonian can be realized on a simple 2-dimensional geometry with d-body interactions, wherein d=4, and wherein interactions correspond to plaquettes of the 2-dimensional lattice. Further, this embodiment allows for a scalable implementation, since adding one spin in the Ising spin model is equivalent to adding a line of n spins to the quantum system.

The embodiment described with reference to FIGS. 10-13 relates to an Ising spin model involving pairwise interactions between n spins, wherein the field coefficients are zero. A similar encoding can be considered for an Ising spin model with non-zero field coefficients. An additional spin $s_{n+1}$ can be included in the Ising model, wherein $s_{n+1}$ is fixed to the value +1. The non-zero field coefficients may then be reformulated as coupling coefficients between the n spins and the additional spin $s_{n+1}$. The Ising spin model with non-zero field coefficients is thus mapped to an Ising spin model wherein the field coefficients are zero. A mapping to a quantum system in the manner described above can thus be applied. Adding the additional spin $s_{n+1}$ involves including an additional line of n qubits to the quantum system.

Further, an encoding can also be considered for an Ising spin model involving interactions between groups of three spins. In this case, the Ising energy function may have the form $$H(s_1, s_2, \ldots, s_n) = \Sigma_{ijk} c_{ijk} s_i s_j s_k$$

wherein the coefficients $c_{ijk}$ represent 3-body interactions between the spins $s_j$ and $s_k$, and wherein i>j>k. A mapping of such a 3-body Ising model onto a quantum system and an encoding of the corresponding Ising spin model problem into a problem Hamiltonian of the quantum system are illustrated in FIGS. 14-17. In this embodiment, the qubits in the quantum system correspond to triples of spins in the 3-body Ising model. In the 3-body Ising model, there are R=n(n−1)(n−2)/6 triples of spins. Accordingly, the number of qubits is R or more, wherein additional qubits may be included, e.g. ancillary qubits and/or auxiliary qubits in analogy to the mapping for the 2-body Ising spin model described above. In this embodiment, the plurality of qubits is arranged according to a 3-dimensional square lattice 1601 shown in FIG. 17. The problem Hamiltonian may have the form $\Sigma_k J_k \sigma_z^{(k)}$, similar to the case of an Ising spin model involving at most 2-body interactions between the spins. The second short-range Hamiltonian may have the form $\Sigma_l C_l$ wherein the constraint Hamiltonians $C_l$ correspond to plaquettes of the 3-dimensional square lattice. The number of constraint Hamiltonians may be 2(R−n). Similar considerations relating to the boundary of the quantum system, involving 3-body constraint Hamiltonians and/or the inclusion of ancillary qubits and/or auxiliary qubits, apply to this embodiment as well.

While the foregoing is directed to some embodiments of the invention, other and further embodiments may be devised without departing from the scope determined by the claims that follow.

The invention claimed is:

1. A method of computing a solution to a computational problem using a quantum system comprising a plurality of qubits, the method comprising:
   encoding the computational problem into a problem Hamiltonian of the quantum system, wherein the problem Hamiltonian is a single-body Hamiltonian comprising a plurality of adjustable parameters, and wherein the encoding comprises determining, from the computational problem, a problem-encoding configuration for the plurality of adjustable parameters;
   evolving an initial Hamiltonian of the quantum system at an initial time into a final Hamiltonian of the quantum system at a final time via an intermediate Hamiltonian of the quantum system at an intermediate time, wherein the intermediate time is between the initial time and the final time,
   wherein the intermediate Hamiltonian is a linear combination of the initial Hamiltonian, the final Hamiltonian and a first short-range Hamiltonian,
   wherein the final Hamiltonian is the sum of the problem Hamiltonian and a second short-range Hamiltonian, wherein the plurality of adjustable parameters of the problem Hamiltonian are in the problem-encoding configuration;
   measuring at least a portion of the plurality of qubits to obtain a read-out of the quantum system; and
   determining a solution to the computational problem from the read-out.

2. The method of claim 1, wherein the first short-range Hamiltonian is a single-body Hamiltonian.

3. The method of claim 1, wherein the initial Hamiltonian is evolved into the final Hamiltonian via the intermediate Hamiltonian by a diabatic quantum process.

4. The method of claim 1, further comprising initializing the quantum system in an initial quantum state by cooling the quantum system towards a ground state of the initial Hamiltonian.

5. The method of claim 1, wherein the initial Hamiltonian is evolved into the final Hamiltonian via the intermediate Hamiltonian according to a first time-dependent interpolation Hamiltonian, wherein the obtained read-out of the quantum system is a first read-out, wherein the determined solution to the computational problem is a first solution, wherein the method further comprises:
   evolving the initial Hamiltonian into the final Hamiltonian according to a second time-dependent interpolation Hamiltonian, followed by:
      measuring at least a portion of the plurality of qubits to obtain a second read-out of the quantum system;
      determining a second solution to the computational problem from the second read-out;
      comparing the first solution with the second solution; and
      based on the comparing, selecting a third time-dependent interpolation Hamiltonian for evolving the initial Hamiltonian into the final Hamiltonian.

6. The method of claim 1, wherein the initial Hamiltonian is a single-body Hamiltonian of the form $\Sigma_k H^{(k)}$, wherein each $H^{(k)}$ is a summand Hamiltonian acting on qubit k only, wherein evolving the initial Hamiltonian into the final Hamiltonian via the intermediate Hamiltonian comprises individually switching off a first summand Hamiltonian $H^{(k1)}$ of the initial Hamiltonian.

7. The method of claim 1, wherein the plurality of qubits are arranged according to a 2-dimensional lattice or according to a 3-dimensional lattice.

8. The method of claim 1, wherein the plurality of adjustable parameters of the problem Hamiltonian comprise at least one of a plurality of field strengths and/or a plurality of field directions of single-body fields acting on the plurality of qubits.

9. The method of claim 1, wherein at least one of the first short-range Hamiltonian and the second short-range Hamiltonian is a d-body Hamiltonian, wherein d=4.

10. The method of claim 1, wherein the problem Hamiltonian has the form $\Sigma2_k J_k \sigma_z^{(k)}$, wherein each $\sigma_z^{(k)}$ is a Pauli operator acting on qubit k only, wherein each $J_k$ is a coefficient, and wherein the coefficients $J_k$ form the plurality of adjustable parameters of the problem Hamiltonian.

11. The method of claim 1, wherein the first short-range Hamiltonian has the form $\Sigma_k b_k \sigma_y^{(k)}$, wherein each $\sigma_y^{(k)}$ is a Pauli operator acting on qubit k only, and wherein each $b_k$ is a coefficient.

12. The method of claim 1, wherein the plurality of qubits are arranged according to a 2-dimensional lattice and wherein at least one of the first short-range Hamiltonian and the second short-range Hamiltonian involves interactions between groups of four qubits corresponding to plaquettes of the 2-dimensional lattice.

13. The method of claim 1, wherein the computational problem is an NP-hard problem.

14. The method of claim 1, wherein determining the problem-encoding configuration comprises:

mapping the computational problem onto an auxiliary computational problem, wherein the auxiliary computational problem comprises determining a ground state of a long-range spin model; and determining the problem-encoding configuration from the long-range spin model.

15. An apparatus for computing solutions to computational problems, comprising:

a quantum system comprising a plurality of qubits;

a cooling unit adapted for cooling the quantum system towards a ground state of the quantum system;

a Hamiltonian evolution unit adapted for evolving an initial Hamiltonian of the quantum system into a final Hamiltonian of the quantum system via an intermediate Hamiltonian of the quantum system, wherein the intermediate Hamiltonian is a linear combination of the initial Hamiltonian, the final Hamiltonian and a first short-range Hamiltonian, wherein the final Hamiltonian is a sum of a problem Hamiltonian and a second short-range Hamiltonian, wherein the problem Hamiltonian is a single-body Hamiltonian comprising a plurality of adjustable parameters;

a measurement device adapted for measuring at least a portion of the plurality of qubits; and a classical computing system connected to the Hamiltonian evolution unit and to the measurement device.

16. The apparatus of claim 15, wherein the first short-range Hamiltonian is a single-body Hamiltonian.

17. The apparatus of claim 15, wherein the Hamiltonian evolution unit is a diabatic Hamiltonian evolution unit configured for evolving the initial Hamiltonian into the final Hamiltonian via the intermediate Hamiltonian by a diabatic quantum process.

18. The apparatus of claim 15, wherein the initial Hamiltonian is a single-body Hamiltonian of the form $\Sigma_k H^{(k)}$, wherein each $H^{(k)}$ is a summand Hamiltonian acting on qubit k only, wherein evolving the initial Hamiltonian into the final Hamiltonian via the intermediate Hamiltonian comprises individually switching off a first summand Hamiltonian $H^{(k1)}$ of the initial Hamiltonian.

19. The apparatus of claim 15, wherein the problem Hamiltonian has the form $\Sigma_k J_k \sigma_z^{(k)}$, wherein each $\sigma_z^{(k)}$ is a Pauli operator acting on qubit k only, wherein each $J_k$ is a coefficient, and wherein the coefficients $J_k$ form the plurality of adjustable parameters of the problem Hamiltonian.

20. The apparatus of claim 15, wherein the first short-range Hamiltonian has the form $\Sigma_k b_k \sigma_y^{(k)}$, wherein each $\sigma_y^{(k)}$ is a Pauli operator acting on qubit k only, and wherein each $b_k$ is a coefficient.

* * * * *